United States Patent
Park et al.

(10) Patent No.: US 10,198,828 B2
(45) Date of Patent: Feb. 5, 2019

(54) IMAGE PROCESSING METHOD AND ELECTRONIC DEVICE SUPPORTING THE SAME

(71) Applicant: Samsung Electronics Co., Ltd., Gyeonggi-do (KR)

(72) Inventors: Hyun Woo Park, Gyeonggi-do (KR); Woo Jin Jun, Gyeonggi-do (KR); Hyun Sang Jung, Gyeonggi-do (KR); Hun Taek Han, Gyeonggi-do (KR); Hyuk Kang, Gyeonggi-do (KR); Tae Ho Kim, Chungcheongbuk-do (KR); Tae Gun Park, Gyeonggi-do (KR); Gyu Cheol Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/713,871

(22) Filed: Sep. 25, 2017

(65) Prior Publication Data

US 2018/0101965 A1    Apr. 12, 2018

(30) Foreign Application Priority Data

Oct. 7, 2016   (KR) .................. 10-2016-0130111

(51) Int. Cl.
| | |
|---|---|
| *G06K 9/00* | (2006.01) |
| *H04W 4/02* | (2018.01) |
| *G06T 7/73* | (2017.01) |
| *H04N 1/00* | (2006.01) |

(52) U.S. Cl.
CPC ........... *G06T 7/73* (2017.01); *H04N 1/00204* (2013.01); *H04W 4/02* (2013.01)

(58) Field of Classification Search
CPC ....... G06T 7/73; G06T 7/248; H04N 1/00204; H04N 1/00281; H04N 1/32106; H04N 2201/3205; H04N 2201/3226; H04N 2201/3253; H04N 5/23229; H04W 4/02; H04W 4/021; H04W 4/023; H04W 4/185; G06K 9/00624; G06K 2009/00328; G06K 9/00221; G06K 9/00261; G06K 9/00268;
(Continued)

(56) References Cited

U.S. PATENT DOCUMENTS

| | | | |
|---|---|---|---|
| 9,076,040 B1* | 7/2015 | Jing ........................ G01C 21/20 | |
| 2006/0095540 A1* | 5/2006 | Anderson .......... H04N 1/00281 | |
| | | | 709/217 |
| 2006/0208943 A1 | 9/2006 | Gronemeyer | |

(Continued)

FOREIGN PATENT DOCUMENTS

| | | |
|---|---|---|
| KR | 10-2007-0114150 A | 11/2007 |
| KR | 10-2010-0041926 A | 4/2010 |

*Primary Examiner* — Nathan S Taylor
(74) *Attorney, Agent, or Firm* — Cha & Reiter, LLC

(57) ABSTRACT

An electronic device is provided. The electronic device includes a camera, a communication circuit configured to communicate with an external electronic device, and a processor. The processor is configured to obtain an image using the camera, verify location information of the image, obtain identification information of the external electronic device from the external electronic device if the location information of the image is not verified, and determine the location information of the image based on the identification information of the external electronic device.

17 Claims, 15 Drawing Sheets

(58) Field of Classification Search
CPC ............. G06K 9/00288; G06K 9/0063; G06K 9/00671; G06K 6/6201; G06K 9/6267
USPC .......... 455/414.1–414.2; 348/207.1; 709/217
See application file for complete search history.

(56) References Cited

U.S. PATENT DOCUMENTS

| | | | | |
|---|---|---|---|---|
| 2014/0368670 | A1* | 12/2014 | Morley | H04N 5/23229 348/207.1 |
| 2015/0154447 | A1* | 6/2015 | Wilson | G06K 9/00624 382/103 |

* cited by examiner

IMAGE PROCESSING METHOD AND ELECTRONIC DEVICE SUPPORTING THE SAME

CLAIM OF PRIORITY

This application claims the benefit under 35 U.S.C. § 119(a) of a Korean patent application filed on Oct. 7, 2016 in the Korean Intellectual Property Office and assigned Serial number 10-2016-0130111, the entire disclosure of which is hereby incorporated by reference.

TECHNICAL FIELD

The present disclosure generally relates to an image processing method and an electronic device supporting the same.

BACKGROUND

Electronic devices such as smartphones or the like may support image capture functions using cameras. Also, the electronic devices may append and store location information associated with the photographed location or place to the photographed image file and may output the location information together with the photographed image on the displays of the electronic devices.

SUMMARY

When an electronic device fail to capture the location information associated with the photographed location, the electronic device may display only the photographed image on the display.

Various embodiments of the present disclosure may provide an image processing method that obtains identification information from an external device, which is placed adjacent to where the image is photographed, if the image capturing apparatus fails to obtain the location information associated with the image. The obtained identification information may be stored. An electronic device supporting the same is also provided.

In accordance with an aspect of the present disclosure, an electronic device may include a camera, a communication circuit configured to communicate with an external electronic device, and a processor. The processor is configured to obtain an image using the camera, verify location information of the image, obtain identification information of the external electronic device from the external electronic device if the location information of the image is not verified, and determined the location information of the image based on the identification information of the external electronic device.

In accordance with another aspect of the present disclosure, an image processing method of an electronic device may include obtaining an image using a camera, verifying location information of the image, obtaining identification information of an external electronic device from the external electronic device through a communication circuit if the location information of the image is not verified, and determining the location information of the image based on the identification information of the external electronic device.

According to various embodiments of the present disclosure, an advantage of the present disclosure is that it may be possible to determine the location of an image even when the location services of the image capturing apparatus is offline. This is accomplished by obtaining identification information from an external device adjacent to the location of the image and estimating location information of the image using the identification information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
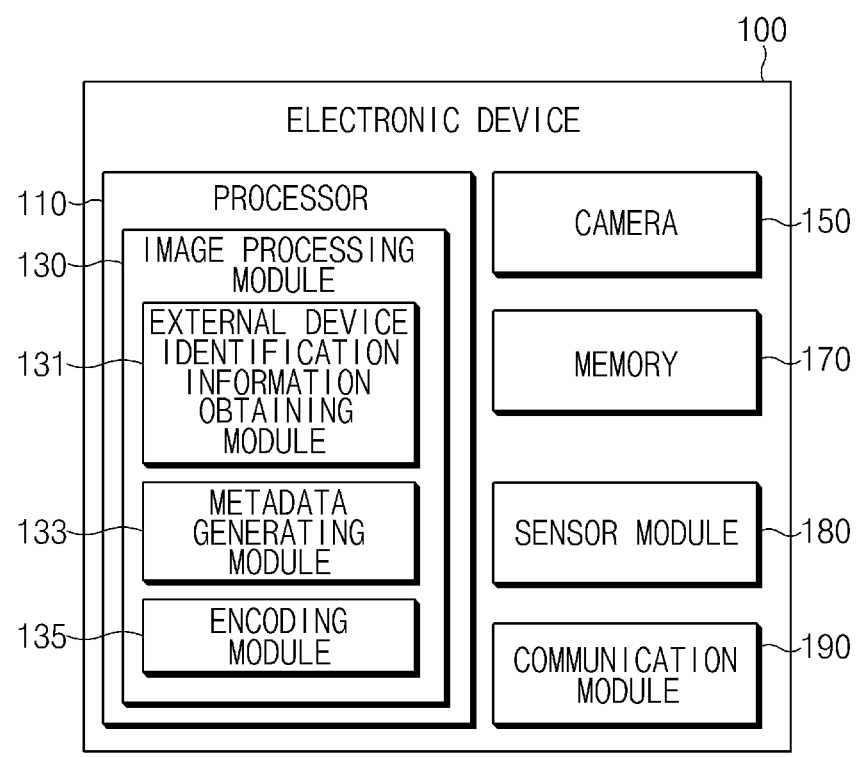
FIG. 1 is a block diagram of an electronic device capable of image capture, according to an embodiment.

Hereinafter, various embodiments of the present disclosure are disclosed with reference to the accompanying drawings. However, the present disclosure is not intended to be limited by the disclosed embodiments and it is intended that the present disclosure covers all modifications, equivalents, and/or alternatives of the present disclosure provided they are within the scope of the appended claims and their equivalents.

The terms and words used in the following description and claims are not limited to their dictionary meanings, but may be used by the inventor to enable a clear and consistent understanding of the present disclosure. Accordingly, it should be apparent to those skilled in the art that the following description of the various embodiments of the present disclosure is provided for illustration purpose only and not for the purpose of limiting the present disclosure as defined by the appended claims and their equivalents.

It is to be understood that the singular forms "a," "an," and "the" include the plural thereof unless the context clearly dictates otherwise. Thus, for example, a reference to "a component surface" may include one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. Thus, the expression "A or B" or "at least one of A and/or B" may indicate (1) at least one A, (2) at least one B, or (3) both at least one A and at least one B.

The terms such as "1st," "2nd," "first," "second," and the like used herein may be used to distinguish various different elements in the present disclosure, but are not intended to limit those elements. For instance, "a first user device" and "a second user device" may indicate different user devices regardless of order or importance. Accordingly, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In contrast, when a component (for example, a first component) is referred to as being "directly connected to" or "directly accessed by" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of," depending on the context. The term "configured to" may not necessarily indicate "specifically designed to" in terms of hardware. Instead, the expression "a device configured to" in some situations may indicate that the device, alone or in conjunction with another device, are "capable of" For example, the expression "a processor configured to perform A, B, and C" may indicate a dedicated processor (for example, an embedded processor) for performing A, B, and C operations or a general purpose processor (for example, a central processing unit (CPU) or application processor (AP)) that performs A, B, and C by executing at least one software program stored in a corresponding memory device.

Terms used in various embodiments of the present disclosure are used to describe certain embodiments of the present disclosure, but are not intended to limit the scope of other embodiments. Unless made clear by the context or indicated otherwise, all terms used herein may have the same meanings that are generally understood by a person skilled in the art, and should not be understood to have excessively formal meanings. In any case, even the terms specifically defined in the present specification are not intended to be interpreted as excluding embodiments of the present disclosure.

An electronic device according to various embodiments of the present disclosure may be a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may be an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In one or more embodiments of the present disclosure, the electronic device may be a home appliance. The smart home appliance may be, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame In other embodiments of the present disclosure, the electronic device may be a medical device (e.g., a portable medical measurement device, such as a blood glucose measuring device, a heart rate measuring device, a blood pressure measuring device, a body temperature measuring device, or the like, a magnetic resonance angiography (MRA) device, a magnetic resonance imaging (MRI) device, a computed tomography (CT) device, a medical scanner, an ultrasonic scanner, or the like), a navigation device, a global navigation satellite system (GNSS) device, an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to yet other embodiments of the present disclosure, the electronic device may be a part of furniture or a building/structure, an electronic board, an electronic signature receiving device, a projector, or a measuring instrument (e.g., a water meter, an electricity meter, a gas meter, a wave meter, or the like). The electronic device according to the present disclosure may be one or more combinations of the above-mentioned devices. The electronic device may also be a flexible device. The electronic device according to one or more embodiments of the present disclosure is not limited to the above-mentioned devices, and may include other electronic devices that are developed in the art.

Hereinafter, an electronic device according to one or more embodiments of the present disclosure will be described in more detail with reference to the accompanying drawings. The term "user" used herein may refer to a person who uses the electronic device or may refer to a device (e.g., an artificial intelligence electronic device) that uses the electronic device.

FIG. 1 is a block diagram of an electronic device capable of image capture, according to an embodiment.

According to an embodiment, an electronic device 100 may add location information associated with a point (e.g. a physical location), at which an image is photographed, to the image photographed through a camera 150. The point may be referred to hereinafter as the "photographing point." The electronic device 100 may also store the location information together with the image. However, when the electronic device 100 fails to obtain the location information, the electronic device 100 may obtain identification information from an external device that is placed at a location adjacent to the photographing point. The electronic device 100 may then obtain the location information using the identification information and may store the obtained identification information together with the image. The electronic device 100 may fail to obtain the location information when its communication module 190 (e.g., a GNSS module) is inactive, when the signal received through the communication module 190 is too weak, when there is a network connection issue (e.g., when the electronic device 100 cannot connect to the network or the server), etc.

The electronic device 100 that supports the above-described function may include a processor 110, the camera 150, a memory 170, a sensor module 180, and the communication module 190. However, the configuration of the electronic device 100 is not so limited. In other embodiments, the electronic device 100 may not include at least one of the above-described elements, or may further include at least another element. For example, the electronic device 100 may further include an audio module.

The processor 110 may perform data processing and operations associated with control and/or communication of at least one other element(s) of the electronic device 100. According to an embodiment, the processor 110 may include an image processing module 130 for image processing. The image processing module 130 may perform functions for processing images photographed by the camera 150. The image processing module 130 may include, for example, an external device identification information obtaining module 131, a metadata generating module 133, or an encoding module 135.

The external device identification information obtaining module 131 may obtain identification information of an external device by using the communication module 190. The external device that is an electronic device capable of communicating with the electronic device 100 and may be, for example, a device that is capable of performing communication using various protocols such as wireless-fidelity (Wi-Fi), Bluetooth (BT), Bluetooth low energy (BLE), near field communication (NFC), beacon, light fidelity (Li-Fi), or the like. According to an embodiment, the external device may include a communication relay device such as an access point (AP), a hub, or the like. The identification information of the external device may include, for example, Wi-Fi scan information, BT/BLE scan information, audio beacon information, Li-Fi scan information, or the like. In one embodiment, the identification information of the external device may be received together with the MAC address information of the external device. At the same time, the electronic device 100 may also detect the signal intensity received from the external device.

The metadata generating module 133 may generate metadata, such as attribute information, associated with the image. According to an embodiment, the metadata generating module 133 may generate attribute information such as encoding/decoding information of the image, size information of the image, or the like, as metadata. Also, the metadata generating module 133 may include the identification information of the external device in the metadata. The metadata may include a supplemental enhancement information (SEI) message.

The encoding module 135 may encode the image. According to an embodiment, the encoding module 135 may encode only the image. According to another embodiment, the encoding module 135 may encode the image and the metadata together. In this case, the metadata may be included in a header area of the image file. The metadata included in the header area may be the SEI message, and the SEI message may be information that is ignored when the encoded data are decoded. In one embodiment, the encoding module 135 may include location information obtained based on the identification information of the external device in the encoded data.

According to an embodiment, the processor 110 may append the metadata to the encoded data instead of encoding the encoded data and the metadata together using the encoding module 135. In this case, the metadata may not be included in the header area of the encoded data.

According to an embodiment, the processor 110 may obtain location information of the external device based on the identification information of the external device, which may be included in the metadata. For example, the processor 110 may transmit the identification information of the external device to a server, which manages the identification information and location information of the external device, through the communication module 190. The server may generate the location information of the external device from the identification information, and may transmit the location information of the external device to the electronic device 100. In another example, when the identification information and the location information of the external device are stored in the memory 170, the processor 110 may obtain the location information of the external device from the memory 170.

The image processing module 130 is illustrated in FIG. 1 as being as an element included in the processor 110, but embodiments of the present disclosure may not be so limited. In another embodiment, the image processing module 130 may be software stored in the memory 170. For example, the image processing module 130 may include instructions and/or data associated with image processing, and the instructions and data may be stored in a nonvolatile area (e.g., a nonvolatile memory) of the memory 170. In this case, the processor 110 may process the instructions and data stored in the nonvolatile area after loading the instructions and data on a volatile area (e.g., a volatile memory) of the memory 170. The processor 110 may then execute the instructions, process the data, and may store the processed data in the nonvolatile area.

The camera 150 may be capable of photographing still image and videos. According to an embodiment, the camera 150 may include a lens that refracts light, an aperture that adjusts the amount of light passing through the lens, a shutter that closes or opens the aperture such that an image sensor is exposed to the light passing through the lens when the shutter is open, the image sensor that converts the light into an electrical signal, and an internal memory. The internal memory may temporarily store the photographed image. According to an embodiment, the internal memory may store images photographed be the image sensor before the shutter is manipulated.

According to an embodiment, the processor 110 may display the image stored in the internal memory as a preview image or the like. The processor 110 may also transfer the image photographed when the shutter is manipulated by the user from the internal memory to the memory 170.

The memory 170 may store instructions and/or data associated with at least one other element of the electronic device 100. For example, the memory 170 may store software and/or programs. For example, the memory 170 may store programs associated with image processing According to an embodiment, the memory 170 may store images photographed by the camera 150. For example, the memory 170 may store data obtained by encoding the image. According to an embodiment, the memory 170 may store the identification information of the external device. For example, the memory 170 may store metadata generated based on the identification information of the external device. The memory 170 may store the identification information of the external device and the location information of the external device. For example, the memory 170 may store the identification information of the external device, and the location information of the external device that may be obtained using the identification information of the external device. The memory 170 may store the identification information and location information of the external device in a lookup table.

The sensor module 180 may measure physical quantities or may detect operation states of the electronic device 100. The sensor module 180 may convert the measured or detected information to an electrical signal. The sensor module 180 may include, for example, an acceleration sensor, a gyro sensor, a geomagnetic sensor, a barometric pressure sensor, or the like. The sensor module 180 may further include a control circuit for controlling at least one or more sensors included therein.

According to an embodiment, the sensor module 180 may obtain motion information of the electronic device 100 by using data obtained through at least one sensor included in the sensor module 180. Additionally or alternatively, the sensor module 180 may include an ultrasonic sensor, an optical sensor, or the like.

The communication module (or a communication circuit) 190 may establish communication between the electronic device 100 and an external device. For example, the communication module 190 may be connected to a network through wireless communication or wired communication, which the external device is also connected to. The communication module 190 may communicate with the external device through protocols such as Wi-Fi, BT, BLE, NFC, beacon, Li-Fi, or the like.

Figure 2:
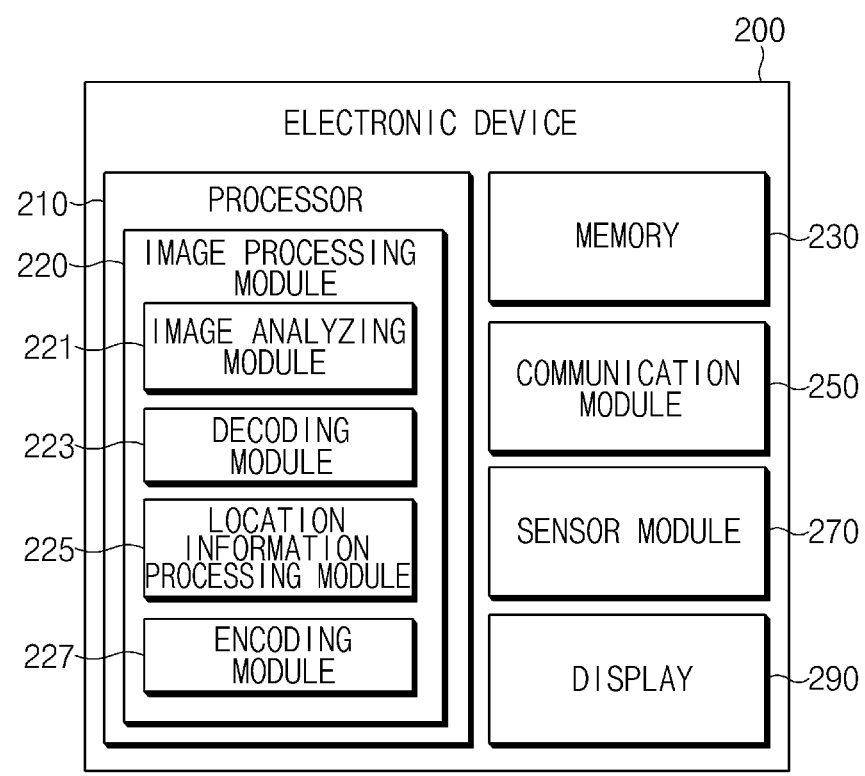
FIG. 2 is a block diagram of an electronic device capable of outputting an image, according to an embodiment.

FIG. 2 is a block diagram of an electronic device capable of outputting an image, according to an embodiment.

According to an embodiment, the electronic device 200 may output an image stored in the memory 230 or an image obtained from an external electronic device (e.g., the electronic device 100), in the display 290. According to an embodiment, the electronic device 200 may output, in the display 290, location information associated with the photographing point of the image together with the image. According to an embodiment, when the location information is not included in the image, the electronic device 200 may determine whether identification information of an external device is included in the image. If so, the electronic device 200 may obtain location information using the identification information and may output the obtained location information in the display 290.

The electronic device 200 that supports the above-described function may include a processor 210, the memory 230, a communication module 250, a sensor module 270, and the display 290. However, the configuration of the electronic device 200 is not so limited. In another embodiment, the electronic device 200 may not include at least one of the above-described elements, or may further include at least another element.

The processor 210 may perform data processing or operations associated with control and/or communication of at least one other element(s) of the electronic device 200. According to an embodiment, the processor 210 may include an image processing module 220 associated with image processing. The image processing module 220 may perform functions associated with processing an image stored in the memory 230 or an image obtained from an external electronic device (e.g., the electronic device 100) that is connected to the electronic device 200 through the communication module 250. The image processing module 220 may include, for example, an image analyzing module 221, a decoding module 223, a location information processing module 225, or an encoding module 227.

The image analyzing module 221 may analyze the image. According to an embodiment, the image analyzing module 221 may analyze encoding/decoding information of the image, size information of the image, or the like. For example, the image analyzing module 221 may analyze the metadata of the image. Alternatively or in addition, the image analyzing module 221 may extract image data (e.g., encoded data) from the image. For example, the image analyzing module 221 may extract encoded data from the image in accordance with the size information of the image.

According to an embodiment, the image analyzing module 221 may determine whether location information associated with the photographing point of the image exists. In the case where the location information is absent from the image, the image analyzing module 221 may determine whether other information from which location information may be obtained is included in the metadata. For example, the image analyzing module 221 may determine whether identification information of an external device, from which location information may be obtained, is included in the metadata.

The decoding module 223 may decode the encoded data that is extracted by the image analyzing module 221. According to an embodiment, the decoding module 223 may decode the encoded data based on the encoding/decoding information of the image. In one embodiment, the decoding module 223 may determine whether the metadata are included in the encoded data. And when the metadata are included in the encoded data, the decoding module 223 may extract the metadata.

The location information processing module 225 may determine whether the identification information of the external device is included in the metadata that is extracted by the image analyzing module 221. If so, the location information processing module 225 may transmit the identification information of the external device to a server using the communication module 250. The server manages the identification information and the location information of the external device. After the server finds the location information of the external device corresponding to the identification information, the server may transmit the location information to the location information processing module 225 through the communication module 250. In another example, when the identification information and the location information of the external device are stored in the memory 230, the location information processing module 225 may obtain the location information from the memory 230.

The encoding module 227 may encode the image. According to an embodiment, the encoding module 227 may re-encode the location information, which was obtained based on the identification information of the external device included in the metadata, together with the encoded data.

The image processing module 220 is illustrated in FIG. 2 as being as an element included in the processor 210, but embodiments of the present disclosure may not be so limited. In another embodiment, the image processing module 220 may be software stored in the memory 230. For example, the image processing module 220 may include instructions and/or data associated with image processing, and the instructions and data may be stored in a nonvolatile area (e.g., a nonvolatile memory) of the memory 230. In this case, the processor 210 may process the instructions and data stored in the nonvolatile area after loading the instructions and data on a volatile area (e.g., a volatile memory) of the memory 230. The processor 210 may then execute the instructions, process the data, and may store the processed data in the nonvolatile area.

The memory 230 may store instructions and/or data associated with at least one other element of the electronic device 200. For example, the memory 230 may store software and/or programs. For example, the memory 230 may store programs associated with image processing According to an embodiment, the memory 230 may store images obtained from an external electronic device (e.g., the electronic device 100). For example, the memory 230 may store data obtained by encoding the image. According to an embodiment, the memory 230 may store the identification information of the external device. For example, the memory 230 may store metadata generated based on the identification information of the external device. The memory 230 may also store data obtained by re-encoding the encoded data and the metadata.

According to an embodiment, the memory 230 may store the identification information of the external device and the location information of the external device. For example, the memory 230 may store the identification information of the external device, and the location information that may be obtained using the identification information of the external device. The memory 230 may store the identification information and location information of the external device in a lookup table.

The communication module (or a communication circuit) 250 may establish communication between the electronic device 200 and an external electronic device (e.g., the electronic device 100). For example, the communication module 250 may be connected to a network through wireless communication or wired communication, which the external electronic device is also connected to. The communication module 250 may communicate with the external electronic device through protocols such as Wi-Fi, BT, BLE, NFC, beacon, Li-Fi, or the like.

The sensor module 270 may measure physical quantities or may detect operation states of the electronic device 200. The sensor module 270 may convert the measured or detected information to an electrical signal. The sensor module 270 may include, for example, an acceleration sensor, a gyro sensor, a geomagnetic sensor, a barometric pressure sensor, or the like. The sensor module 270 may further include a control circuit for controlling at least one or more sensors included therein.

According to an embodiment, the sensor module 270 may obtain motion information of the electronic device 200 by using data obtained through at least one sensor included in the sensor module 270. Additionally or alternatively, the sensor module 270 may include an ultrasonic sensor, an optical sensor, or the like.

The display 290 may display various content (e.g., text, image, video, icon, symbol, and/or the like) to a user. For example, the display 290 may output the image that is processed by the image processing module 220. For example, the display 290 may output the decoded data of the image. Also, the display 290 may output location information associated with the photographing point of the image. According to an embodiment, the display 290 may be a touch screen and may detect, for example, touches, gestures, proximity inputs, or hovering inputs from an electronic pen or a part of a user's body such as a finger.

The various elements of the electronic device 100 and the electronic device 200 may be implemented in a single electronic device. For example, an electronic device that includes various elements of the electronic device 100 and electronic device 200 may photograph images using a camera and may output the photographed images in the display. Also, the electronic device may output, in the display, the image together with location information associated with the photographing point of the image.

As described above, according to one embodiment, an electronic device may include a camera, a communication circuit configured to communicate with an external electronic device, and a processor. The processor may be configured to obtain an image using the camera, verify location information associated with a photographing point of the image, obtain identification information of the external electronic device from the external electronic device if the location information of the image is not verified, and determine the location information of the image based on the identification information of the external electronic device.

According to one embodiment, the electronic device may further include a memory configured to store the identification information of the external electronic device.

According to one embodiment, the electronic device may further include a memory configured to store data associated with a plurality of location information corresponding to identification information of a plurality of external electronic devices, and the processor may be configured to select the location information, which corresponds to the identification information of the external electronic device, from among the plurality of location information based at least on the data, as at least a part of the specifying of the location information.

According to one embodiment, to determine the location information of the image, the processor may be further configured to transmit the identification information of the external electronic device to another external electronic device through the communication circuit, and receive, from the another external electronic device, location information of the external electronic device determined based on the identification information of the external electronic device.

According to one embodiment, to transmit the identification information of the external electronic device to the other external electronic device, the processor may be further configured to include the identification information of the external electronic device in attribute information of the image and transmit the attribute information of the image to the other external electronic device.

According to one embodiment, the electronic device may further include a display, and the processor may be further configured to display the image and the location information of the image in the display.

According to one embodiment, the electronic device may further include a sensor for sensing a movement of the electronic device, and the processor may be further configured to obtain time information associated with when the image is obtained, and determine a movement path of the electronic device based at least on the time information and data generated by the sensor.

According to one embodiment, to determine the location information of the image, the processor may be further configured to obtain at least one of spacing distance information and direction information between the electronic device and the external electronic device, and determine a location relationship between the electronic device and the external electronic device, based on at least one of the spacing distance information and the direction information, determine a location of the external device based on the identification information of the external electronic device, and determine the location information of the image based on the location of the external electronic device and the location relationship between the electronic device and the external electronic device.

According to one embodiment, the processor may be further configured to encode data corresponding to the image, and include the identification information of the external electronic device in the encoded data.

According to one embodiment, the processor may be further configured to include the location information of the image in the metadata corresponding to the image.

According to one embodiment, the external electronic device may be capable of communication using at least one of wireless-fidelity (Wi-Fi), Bluetooth (BT), Bluetooth low energy (BLE), near field communication (NFC), beacon, and light-fidelity (Li-Fi).

According to one embodiment, the identification information of the external electronic device may include at least one of Wi-Fi scan information, BT/BLE scan information, audio beacon information, and Li-Fi scan information.

Figure 3:
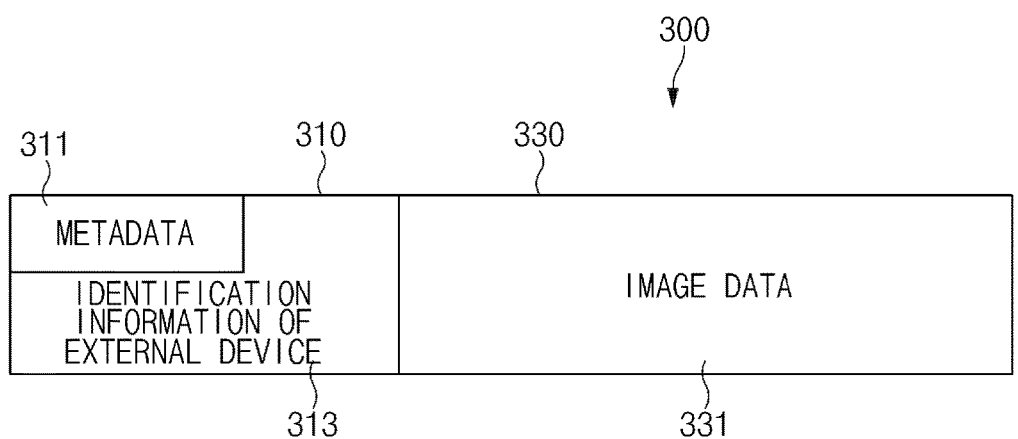
FIG. 3 is a block diagram illustrating a data structure of an image according to an embodiment.

FIG. 3 is a block diagram illustrating a data structure of an image according to an embodiment.

Referring to FIG. 3, an image 300 may include a header area 310 and a body area 330. Information associated with the image 300, for example, encoding/decoding information of the image 300, size information of the image 300, or the like may be included in the header area 310. For example, the header area 310 may include metadata 311. The metadata 311 may include an SEI message.

According to an embodiment, the header area 310 may include location information associated with the photographing point of the image 300. In one embodiment, the header area 310 may include identification information 313 of an external device, from which the location information may be determined. According to another embodiment, the identification information of the external device may be included in the metadata 311.

The body area 330 may include image data 331. The image data 331 may include encoded data.

Figure 4:
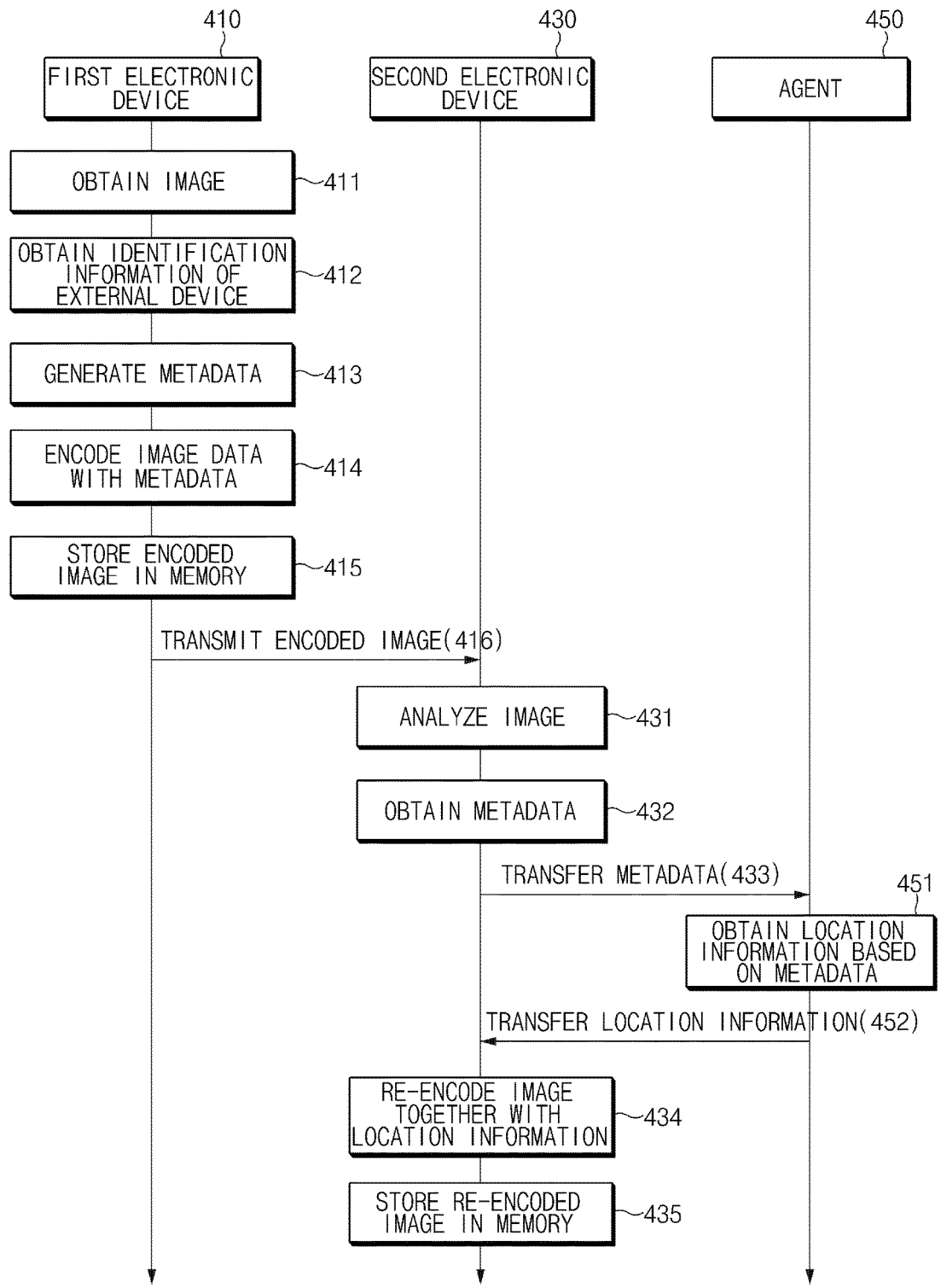
FIG. 4 is a flowchart illustrating a first operating method of a system capable of processing an image, according to an embodiment.

FIG. 4 is a flowchart illustrating a first operating method of a system capable of processing an image, according to an embodiment.

Referring to FIG. 4, in operation 411, a first electronic device 410 (e.g., the electronic device 100 of FIG. 1) may obtain an image. According to an embodiment, the first electronic device 410 may obtain the image using a camera (e.g., the camera 150 of FIG. 1).

In operation 412, the first electronic device 410 may obtain identification information of an external device. According to an embodiment, when the first electronic device 410 fails to obtain location information associated with the photographing point of the image when the image is obtained, the first electronic device 410 may obtain identification information from the external device, the external device being adjacent to the photographing point. For example, when the first electronic device 410 fails to obtain the location information due to a communication error or the like, the first electronic device 410 may obtain scan information of an external device such as a communication relay device or an AP. The scan information may be obtained by the first electronic device 410 even when communication with the communication relay device or AP is not initiated.

In operation 413, the first electronic device 410 may generate metadata. According to an embodiment, the metadata may include the identification information of the external device. The metadata may include an SEI message that includes additional information that are ignored when the image data is decoded.

In operation 414, the first electronic device 410 may encode the image. According to an embodiment, the first electronic device 410 may encode image data using a particular scheme (e.g. JPEG) and may include the metadata in a header area of the encoded data.

In operation 415, the first electronic device 410 may store the encoded image in a memory (e.g., the memory 170 of FIG. 1). According to an embodiment, the first electronic device 410 may store the encoded data including the metadata in the memory.

In operation 416, the first electronic device 410 may transmit the encoded image to a second electronic device 430 (e.g., the electronic device 200 of FIG. 2). According to an embodiment, the first electronic device 410 may transmit the encoded image to the second electronic device 430 through a communication module (e.g., the communication module 190 of FIG. 1).

In operation 431, the second electronic device 430 may analyze the encoded image obtained from the first electronic device 410. According to an embodiment, the second electronic device 430 may analyze encoding/decoding information of the encoded image, size information of the encoded image, or the like. Also, the second electronic device 430 may determine whether the metadata are included in the encoded image.

In operation 432, the second electronic device 430 may obtain the metadata (e.g. decode the metadata). According to an embodiment, the second electronic device 430 may obtain the metadata while extracting the encoded data in accordance with the size information of the encoded image.

In operation 433, the second electronic device 430 may transfer the metadata to an agent 450. The agent 450 may be, for example, a server that manages the identification information of the external device and the location information of the external device. Alternatively, the agent 450 may be a module included in the second electronic device 430. Regardless of whether the agent is an external server or a module included in the second electronic device 430, the agent 450 may manage a lookup table in which the identification information of the external device and the location information of the external device are included. When the agent 450 is a module included in the second electronic device 430, the lookup table may be stored in a memory (e.g., the memory 230 of FIG. 2) included in the second electronic device 430.

In operation 451, the agent 450 may obtain the location information of the external device based on the metadata. According to an embodiment, the agent 450 may obtain the location information of the external device from the identification information of the external device included in the metadata. In operation 452, the agent 450 may transfer the location information of the external device to the second electronic device 430.

In operation 434, the second electronic device 430 may re-encode the image together with the location information of the external device obtained from the agent 450. According to an embodiment, the second electronic device 430 may include the location information of the external device in the header area of the encoded data. In operation 435, the second electronic device 430 may store the re-encoded image in a memory.

Thus, in one or more embodiments of the present disclosure, the second electronic device 430 may determine location information associated with the photographing point of the image based on the location information of the external device. In this regard, the second electronic device 430 may determine the location information associated with the photographing point of the image by using a location relationship between the first electronic device 410 and the external device. The location relationship may be obtained when the image is photographed. Alternatively, the location relationship between the first electronic device 410 and the external device may be determined while the identification information of the external device is obtained in operation 412. For example, the first electronic device 410 may obtain a spacing distance and direction information between the external device and the first electronic device 410 when it obtains the identification information of the external device in operation 412. The first electronic device 410 may then determine the location relationship between the first electronic device 410 and the external device by using the spacing distance and the direction information. In another example, the first electronic device 410 may obtain the intensity of a signal received from the external device together while obtaining the identification information of the external device in operation 412. In this case, the first electronic device 410 may determine the location relationship between the first electronic device 410 and the external device by using the signal intensity. Alternatively, the first electronic device may obtain the MAC address information of the external device, determine the location of the external device based on the MAC address information, and determine the location relationship between the first electronic device 410 and the external device. Also, in operation 416, the first electronic device 410 may transmit information about the location relationship between the first electronic device 410 and the external device together with the encoded image to the second electronic device 430.

In various embodiments, all the above-described operations may be performed by the first electronic device 410 or the second electronic device 430. For example, operation 411 to operation 415 may be performed by the second electronic device 430, and operation 431 to operation 435 may be performed by the first electronic device 410. Also, for example, operation 412 may be performed before operation 411 is performed or at the same time with operation 411.

Figure 5:
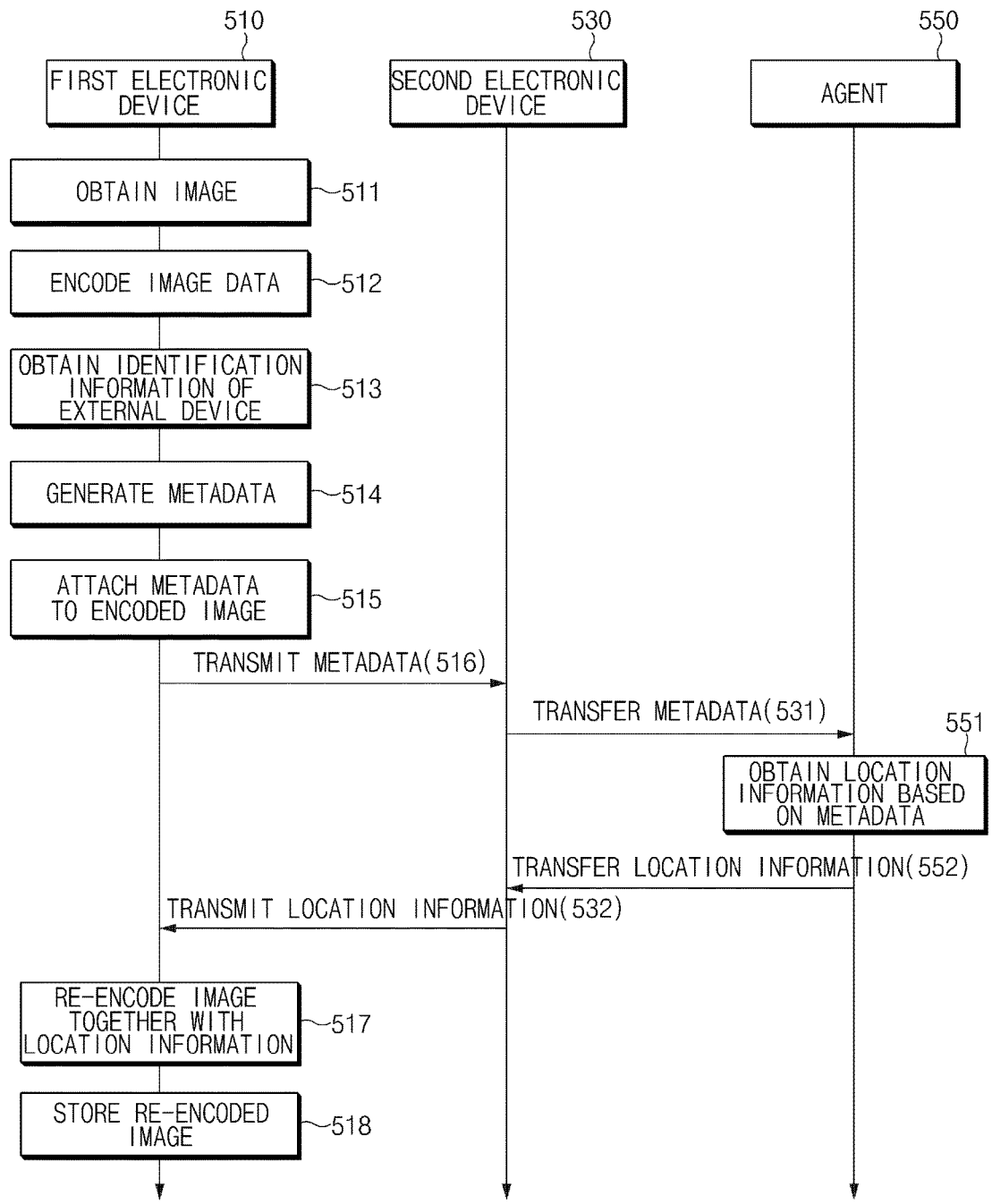
FIG. 5 is a flowchart illustrating a second operating method of a system capable of processing an image, according to an embodiment.

FIG. 5 is a flowchart illustrating a second operating method of a system capable of processing an image, according to an embodiment.

Referring to FIG. 5, in operation 511, a first electronic device 510 (e.g., the electronic device 100 of FIG. 1) may obtain an image. According to an embodiment, the first electronic device 510 may obtain an image using a camera (e.g., the camera 150 of FIG. 1).

In operation 512, the first electronic device 510 may encode the image. According to an embodiment, the first electronic device 510 may encode the image data using a particular scheme (e.g. JPEG).

In operation 513, the first electronic device 510 may obtain identification information of an external device. In one embodiment, when the first electronic device 510 fails to obtain location information associated with the photographing point of the image when the image is obtained, the first electronic device 510 may obtain identification information from the external device, the external device being adjacent to the photographing point.

In operation 514, the first electronic device 510 may generate metadata. According to an embodiment, the metadata may include the identification information of the external device.

In operation 515, the first electronic device 510 may attach or append the metadata to the encoded image. According to an embodiment, the first electronic device 510 may attach the metadata to the encoded image data instead of encoding the metadata with the image data, as shown in operation 414 of FIG. 4. In this case, the metadata may not be included in the header area of the encoded data.

In operation 516, the first electronic device 510 may transmit the metadata to a second electronic device 530 (e.g., the electronic device 200 of FIG. 2). According to an embodiment, the first electronic device 510 may transmit the metadata to the second electronic device 530 using a communication module (e.g., the communication module 190 of FIG. 1).

In operation 531, the second electronic device 530 may transfer the metadata obtained from the first electronic device 510 to an agent 550. The agent 550 may be, for example, a server that manages the identification information and the location information of the external device. Alternatively, the agent 550 may be a module included in the second electronic device 530. The agent 550 may manage a lookup table in which the identification information and the location information of the external device are included. When the agent is a module of the second electronic device 530, the lookup table may be stored in a memory (e.g., the memory 230 of FIG. 2) included in the second electronic device 530.

In operation 551, the agent 550 may obtain the location information of the external device based on the metadata. According to an embodiment, the agent 550 may obtain the location information of the external device from the identification information of the external device included in the metadata. In operation 552, the agent 550 may transfer the location information of the external device to the second electronic device 530.

In operation 532, the second electronic device 530 may transmit the location information of the external device obtained from the agent 550 to the first electronic device 510. According to an embodiment, the second electronic device 530 may transmit the location information of the external device to the first electronic device 510 using a communication module (e.g., the communication module 250 of FIG. 2).

In operation 517, the first electronic device 510 may re-encode the image to include the location information of the external device. According to an embodiment, the first electronic device 510 may include the location information of the external device in the header area of the encoded data. In operation 518, the first electronic device 510 may store the re-encoded image in a memory (e.g., the memory 170 of FIG. 1).

Thus, in one or more embodiments of the present disclosure, the first electronic device 510 may determine location information associated with the photographing point of the image based on the location information of the external device. In this regard, the first electronic device 510 may determine the location information associated with the photographing point of the image by using a location relationship between the first electronic device 510 and the external device. The location relationship may be obtained when the image is photographed. Alternatively, the location relationship between the first electronic device 510 and the external device may be determined while the identification information of the external device is obtained in operation 513. For example, the first electronic device 510 may obtain a spacing distance and direction information between the external device and the first electronic device 510 when it obtains the identification information of the external device in operation 513. The first electronic device 510 may then determine the location relationship between the first electronic device 510 and the external device by using the spacing distance and the direction information.

According to other alternative embodiments, certain elements depicted in FIG. 5 may be omitted. For example, the second electronic device 530 may be omitted in the system. In this case, in operation 516, the first electronic device 510 may transmit the metadata to the agent 550. And in operation 552, the agent 550 may transmit the location information of the external device to the first electronic device 510. When the second electronic device 530 is omitted, the agent 550 may be a module included in the first electronic device 510. When the agent 550 is a module included in the first electronic device 510, the agent 550 may manage a lookup table that is stored in a memory included in the first electronic device 510.

In various embodiments, operation 513 may be performed before operation 511 is performed or at the same time with operation 511. Also, operation 513 may be performed before operation 512 is performed or at the same time with operation 512.

Figure 6:
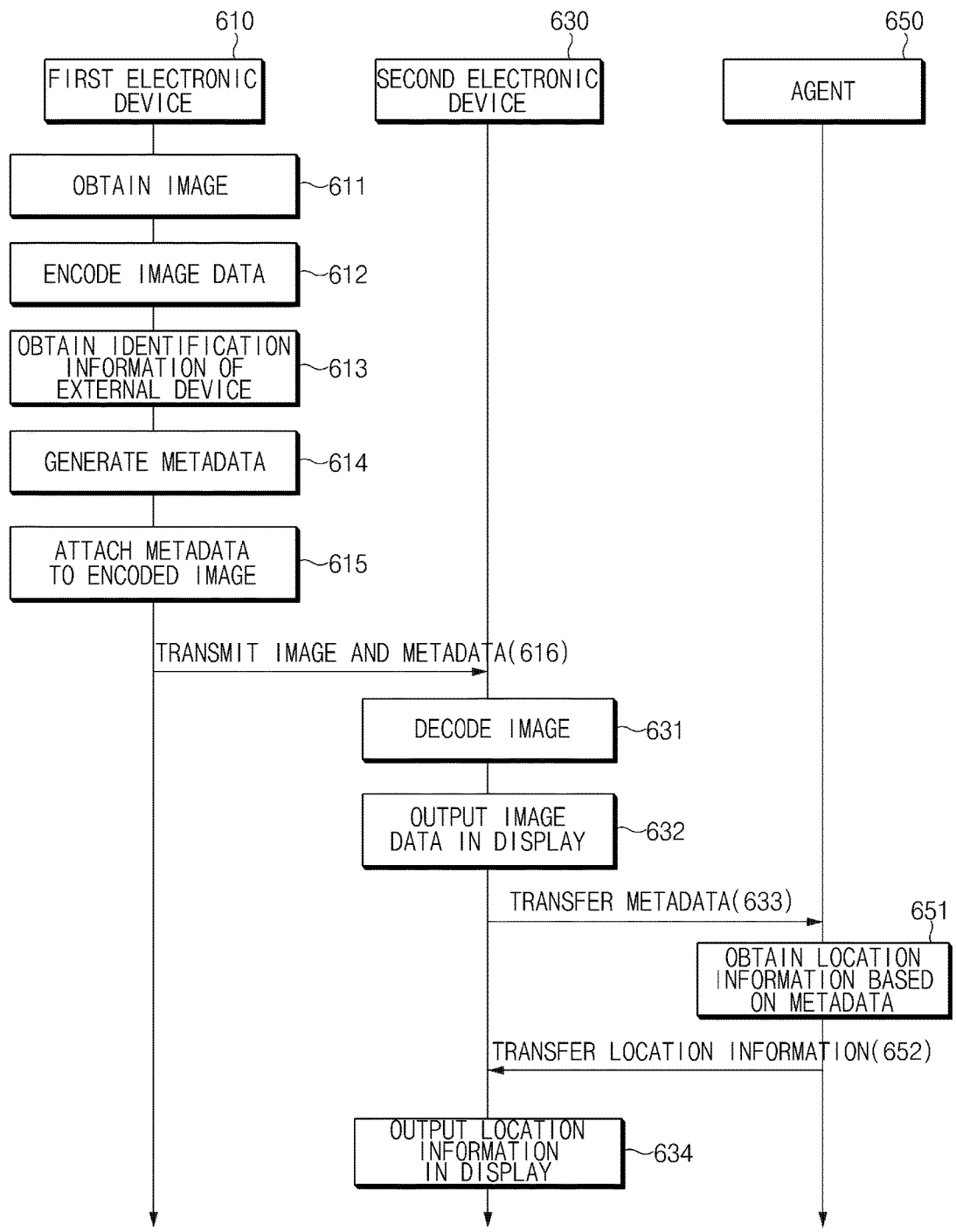
FIG. 6 is a flowchart illustrating a third operating method of a system capable of processing an image, according to an embodiment.

FIG. 6 is a flowchart illustrating a third operating method of a system capable of processing an image, according to an embodiment.

Referring to FIG. 6, in operation 611, a first electronic device 610 (e.g., the electronic device 100 of FIG. 1) may obtain an image. According to an embodiment, the first electronic device 610 may obtain the image using a camera (e.g., the camera 150 of FIG. 1).

In operation 612, the first electronic device 610 may encode the image. According to an embodiment, the first electronic device 610 may encode the image data according to a particular scheme (e.g. JPEG).

In operation 613, the first electronic device 610 may obtain identification information of an external device. According to an embodiment, when the first electronic device 610 fails to obtain location information associated with the photographing point of the image when capturing the image, the first electronic device 610 may obtain identification information from the external device, the external device being adjacent to the photographing point.

In operation 614, the first electronic device 610 may generate metadata. According to an embodiment, the metadata may include the identification information of the external device.

In operation 615, the first electronic device 610 may attach the metadata to the encoded image, such as the encoded image data.

In operation 616, the first electronic device 610 may transmit the encoded image and the metadata to a second electronic device 630 (e.g., the electronic device 200 of FIG. 2). According to an embodiment, the first electronic device 610 may transmit the encoded image and the metadata to the second electronic device 630 using a communication module (e.g., the communication module 190 of FIG. 1).

In operation 631, the second electronic device 630 may decode the encoded image obtained from the first electronic device 610. According to an embodiment, the second electronic device 630 may decode the encoded image based on encoding/decoding information included in the metadata. For example, the second electronic device 630 may extract image data from the encoded image using the same scheme (e.g. JPEG) that was used to encode the image.

In operation 632, the second electronic device 630 may output the decoded image data in a display (e.g., the display 290 of FIG. 2).

In operation 633, the second electronic device 630 may transfer the metadata obtained from the first electronic device 610 to an agent 650. The agent 650 may be, for example, a server that manages the identification information and the location information of the external device. Alternatively, the agent 650 may be a module included in the second electronic device 630. The agent 650 may manage a lookup table in which the identification information and location information of the external device are included. When the agent 650 is a module included in the second electronic device 630, the lookup table may be stored in a memory (e.g., the memory 230 of FIG. 2) included in the second electronic device 630.

In operation 651, the agent 650 may obtain the location information of the external device based on the metadata. According to an embodiment, the agent 650 may obtain the location information of the external device from the identification information of the external device included in the metadata. In operation 652, the agent 650 may transfer the location information of the external device to the second electronic device 630.

In operation 634, the second electronic device 630 may output the location information of the external device obtained from the agent 650 to the display. According to an embodiment, the second electronic device 630 may output, on the display, the location information of the external device together with the image data.

Thus, in one or more embodiments of the present disclosure, the second electronic device 630 may determine location information associated with the photographing point of the image based on the location information of the external device. In this regard, the second electronic device 630 may determine the location information associated with the photographing point of the image by using a location relationship between the first electronic device 610 and the external device. The location relationship may be obtained when the image is photographed. Alternatively, the location relationship between the first electronic device 610 and the external device may be determined while the identification information of the external device is obtained in operation 613. For example, the first electronic device 610 may obtain a spacing distance and direction information between the external device and the first electronic device 610 when it obtains the identification information of the external device. The first electronic device 610 may then determine the location relationship between the first electronic device 610 and the external device by using the spacing distance and the direction information. Also, in operation 616, the first electronic device 610 may transmit information about the location relationship between the first electronic device 610 and the external device together with the encoded image and the metadata to the second electronic device 630.

In various embodiments, operation 611 to operation 615 may be performed by the second electronic device 630. Alternatively or in addition, operation 616 may be omitted. Operation 613 may be performed before operation 611 is performed or at the same time with operation 611. Also, operation 613 may be performed before operation 612 is performed or at the same time with operation 612.

Figure 7:
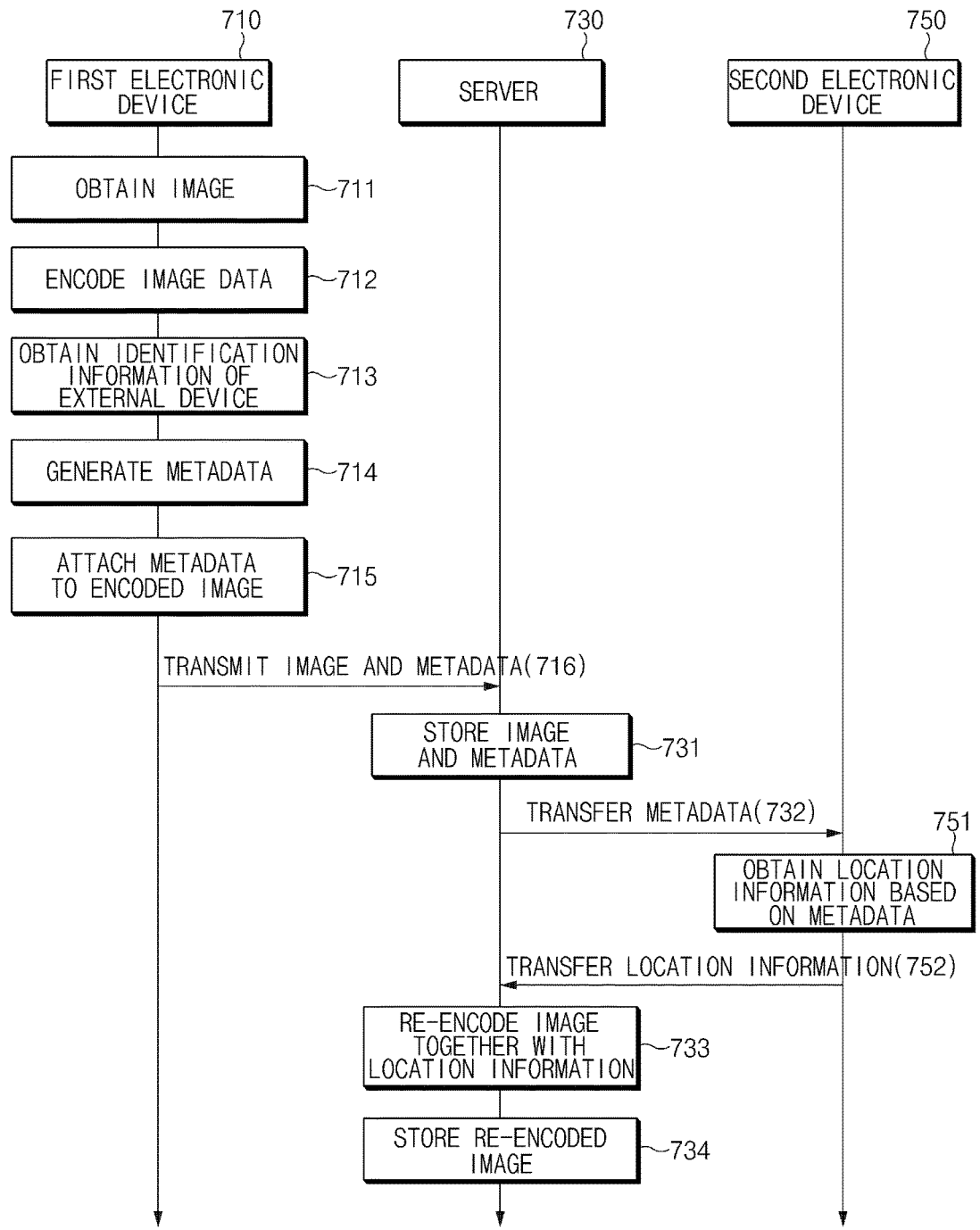
FIG. 7 is a flowchart illustrating a fourth operating method of a system capable of processing an image, according to an embodiment.

FIG. 7 is a flowchart illustrating a fourth operating method of a system capable of processing an image, according to an embodiment.

Referring to FIG. 7, in operation 711, a first electronic device 710 (e.g., the electronic device 100 of FIG. 1) may obtain an image. According to an embodiment, the first electronic device 710 may obtain the image using a camera (e.g., the camera 150 of FIG. 1).

In operation 712, the first electronic device 710 may encode the image. According to an embodiment, the first electronic device 710 may encode image data using a particular scheme (e.g. JPEG).

In operation 713, the first electronic device 710 may obtain identification information of an external device. According to an embodiment, when the first electronic device 710 fails to obtain location information associated with the photographing point of the image when capturing the image, the first electronic device 710 may obtain identification information from the external device, the external device being adjacent to the photographing point.

In operation 714, the first electronic device 710 may generate metadata. According to an embodiment, the metadata may include the identification information of the external device.

In operation 715, the first electronic device 710 may attach or append the metadata to the encoded image data.

In operation 716, the first electronic device 710 may transmit the encoded image and the metadata to a server 730. According to an embodiment, the first electronic device 710 may transmit the encoded image and the metadata to the server 730 using a communication module. The server 730 may be, for example, an electronic device that stores and manages images and shares the images with other electronic devices. The server 730 may be, for example, a service provider server supporting a social network service (SNS) or an external storage server providing external storage space.

In operation 731, the server 730 may store the encoded image and the metadata obtained from the first electronic device 710. In operation 732, the server 730 may transfer the metadata obtained from the first electronic device 710 to a second electronic device 750.

In operation 751, the second electronic device 750 may obtain the location information of the external device using the metadata. According to an embodiment, the second electronic device 750 may obtain the location information of the external device from the identification information of the external device included in the metadata. The second electronic device 750 may be, for example, a server that manages the identification information and the location information of the external device. The second electronic device 750 may manage a lookup table in which the identification information and the location information of the external device are included. The lookup table may be stored in a memory included in the second electronic device 750. The second electronic device 750 may perform functions that are the same as or similar to those of the above-described agents (e.g., the agent 450, 550, or 650). In operation 752, the second electronic device 750 may transfer the location information of the external device to the server 730.

In operation 733, the server 730 may re-encode the image together with the location information of the external device. According to an embodiment, the server 730 may include the location information of the external device in the header area of the encoded data. In operation 734, the server 730 may store the re-encoded image in a memory.

Thus, in one or more embodiments of the present disclosure, the server 730 may determine location information associated with the photographing point of the image based on the location information of the external device. In this regard, the server 730 may determine the location information associated with the photographing point of the image by using a location relationship between the first electronic device 710 and the external device. The location relationship may be obtained when the image is photographed. Alternatively, the location relationship between the first electronic device 710 and the external device may be determined while the identification information of the external device is obtained in operation 713. For example, the first electronic device 710 may obtain a spacing distance and direction information between the external device and the first electronic device 710 when it obtains the identification information of the external device. The first electronic device 710 may then determine the location relationship between the first electronic device 710 and the external device by using the spacing distance and the direction information. Also, in operation 716, the first electronic device 710 may transmit information about the location relationship between the first electronic device 710 and the external device together with the encoded image and the metadata to the server 730.

According to other alternative embodiments, certain operations depicted in FIG. 7 as being performed by the second electronic device 750 may be performed by the server 730. For example, the second electronic device 750 may be omitted in the system. In this case, operation 732 and operation 752 may be omitted, and the server 730 may manage the lookup table that includes the identification information and the location information of the external device.

Operation 713 may be performed before operation 711 is performed or at the same time with operation 711. Also, operation 713 may be performed before operation 712 is performed or at the same time with operation 712.

Figure 8:
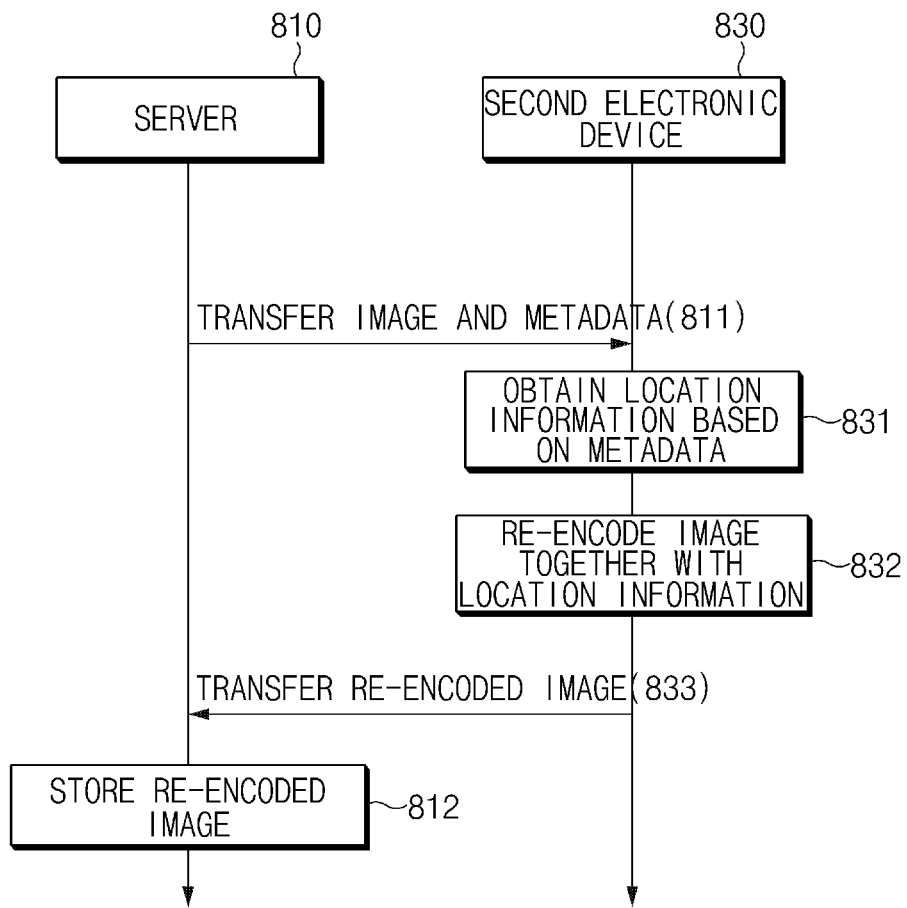
FIG. 8 is a flowchart illustrating a fifth operating method of a system capable of processing an image, according to an embodiment.

FIG. 8 is a flowchart illustrating a fifth operating method of a system capable of processing an image, according to an embodiment.

Referring to FIG. 8, in operation 811, a server 810 may transfer an encoded image and metadata to a second electronic device 830. The image may be, for example, an image photographed using a camera. The metadata may include identification information of an external device. The external device that is an electronic device capable of communication using various protocols such as Wi-Fi, BT, BLE, NFC, beacon, Li-Fi, or the like. According to an embodiment, the external device may be a communication relay device such as an AP or the like. The identification information of the external device may include, for example, Wi-Fi scan information, BT/BLE scan information, audio beacon information, Li-Fi scan information, or the like.

In operation 831, the second electronic device 830 may obtain the location information of the external device based on the metadata obtained from the server 810. According to an embodiment, the second electronic device 830 may obtain the location information of the external device by finding location information that corresponds to the identification information in a look-up table. The second electronic device 830 may manage the lookup table that includes the identification information and the location information of the external device. In this case, the lookup table may be stored in a memory included in the second electronic device 830.

In operation 832, the second electronic device 830 may re-encode the image together with the location information of the external device. According to an embodiment, the second electronic device 830 may include the location information of the external device in the header area of the encoded data. In operation 833, the second electronic device 830 may transfer the re-encoded image to the server 810. In operation 812, the server 810 may store the re-encoded image obtained from the second electronic device 830.

Thus, in one or more embodiments of the present disclosure, the second electronic device 830 may determine location information associated with the photographing point of the image based on the location information of the external device. In this regard, the second electronic device 830 may determine the location information associated with the photographing point of the image by using a location relationship between a photographing device and the external device. The location relationship may be obtained when the image is photographed. In operation 811, the location relationship between the photographing device and the external device may be received with the encoded image and the metadata are received.

Figure 9:
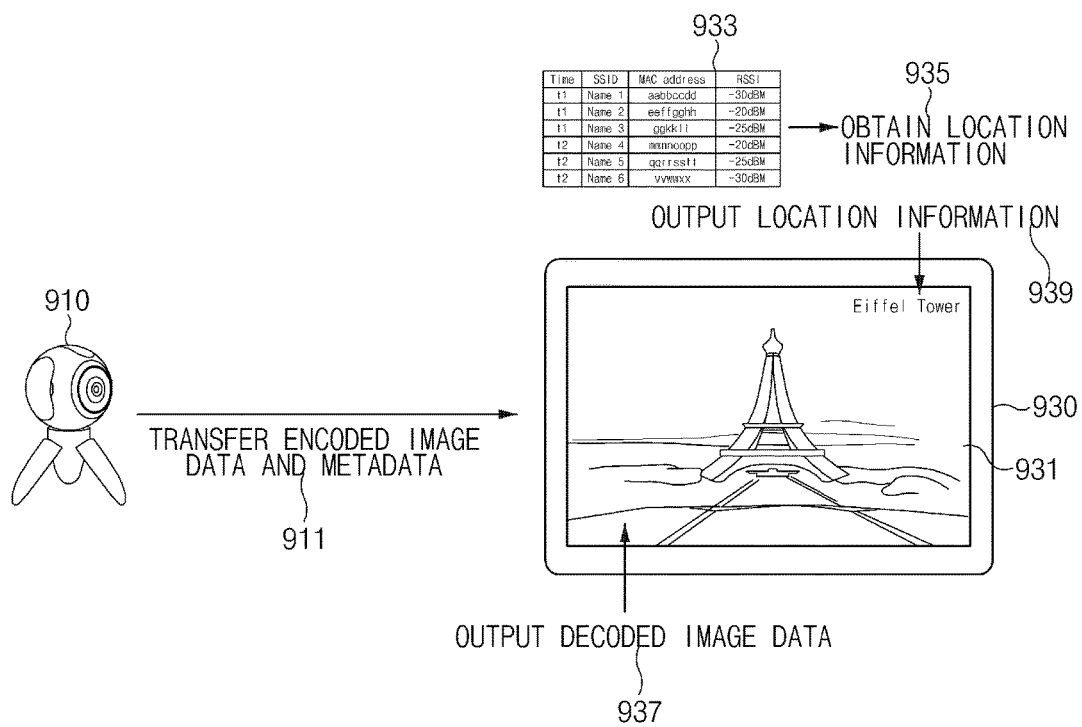
FIG. 9 is a view illustrating an example of a screen of a system capable of processing an image, according to an embodiment.

FIG. 9 is a view illustrating an example of a screen of a system capable of processing an image, according to an embodiment.

Referring to FIG. 9, a first electronic device 910 including a camera (e.g., an omnidirectional (360-degree) camera) may encode the photographed image. When the first electronic device 910 fails to obtain location information associated with the photographing point of the image, the first electronic device 910 may obtain identification information from an external device (not shown) adjacent to the photographing point. The first electronic device 910 may generate metadata based on the identification information of the external device.

In operation 911, the first electronic device 910 may transfer the encoded image data and the metadata to a second electronic device 930. In operation 935, the second electronic device 930 may obtain the location information of the external device based on the metadata obtained from the first electronic device 910. According to an embodiment, the second electronic device 930 may obtain the location information that corresponds to the identification information of the external device in a lookup table 933. Each row of the lookup table 933 may correspond to an external device and may include, for example, a time index indicating when the external device was scanned, a service set identifier (SSID) of the external device, a MAC address of the external device, the intensity of a signal received from the external device (e.g., a received signal strength indication (RSSI)), etc.

In operation 937, the second electronic device 930 may decode the encoded image data and may output the decoded image data in a display 931. In operation 939, the second electronic device 930 may output the location information of the external device in the display 931. According to an embodiment, the second electronic device 930 may output, in the display 931, the location information of the external device together with the decoded image data.

Thus, in one or more embodiments of the present disclosure, the second electronic device 930 may determine location information associated with the photographing point of the image based on the location information of the external device. In this regard, the second electronic device 930 may determine the location information associated with the photographing point of the image by using a location relationship between the first electronic device 910 and the external device. The location relationship may be obtained when the image is photographed. Alternatively, the location relationship between the first electronic device 910 and the external device may be determined while the identification information of the external device is obtained. For example, the first electronic device 910 may obtain a spacing distance and direction information between the external device and the first electronic device 910 when it obtains the identification information of the external device. The first electronic device 910 may then determine the location relationship between the first electronic device 910 and the external device by using the spacing distance and the direction information. Also, in operation 911, the first electronic device 910 may transmit information about the location relationship between the first electronic device 910 and the external device together with the encoded image data and the metadata to the second electronic device 930.

Operation 937 may be performed before operation 935 is performed or at the same time with operation 935. Also, operation 939 may be performed before operation 937 is performed or at the same time with operation 937.

Figure 10:
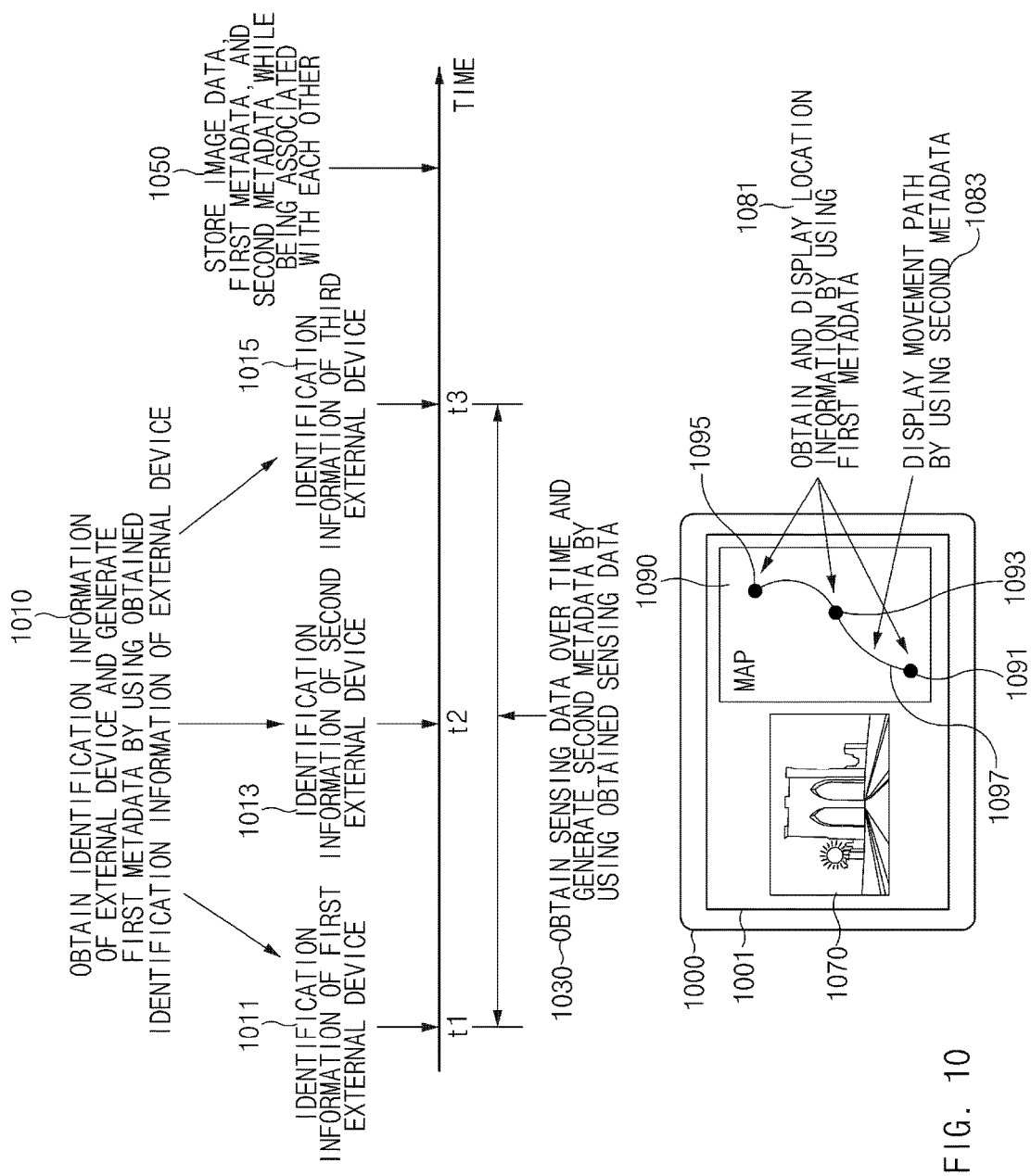
FIG. 10 is a timing diagram and a view illustrating an example of another screen of a system capable of processing an image, according to an embodiment.

FIG. 10 is a timing diagram and a view illustrating an example of another screen of a system capable of processing an image, according to an embodiment.

Referring to FIG. 10, in operation 1010, when obtaining an image 1070 (e.g. a video) photographed using a camera, the electronic device 1000 may obtain identification information from an external device that is adjacent to the photographing point of the image 1070. The electronic device 1000 may generate first metadata by using the identification information of the external device. According to an embodiment, a plurality of first metadata may be generated at a specified time interval while the image 1070 is obtained. For example, the electronic device 1000 may be moving while photographing the image 1070. As the electronic device 1000 is moving, it may obtain identification information of a plurality of different external devices along its movement path. The electronic device 1000 may then generate the first metadata by using the identification information of the plurality of external devices. The electronic device 1000 may generate separate pieces of metadata for each external device or one piece of metadata containing the identification information of all of the external devices. For example, as illustrated in FIG. 10, the first metadata may include identification information 1011 of a first external device obtained at a first time t1, identification information 1013 of a second external device obtained at a second time t2, and identification information 1015 of a third external device obtained at a third time t3 in the first metadata. Also, the electronic device 1000 may associate the times when the identification information were obtained (e.g., time stamps) with the identification information. For example, the electronic device 1000 may include the first time t1, the second time t2, and the third time t3 in the first metadata.

In operation 1030, the electronic device 1000 may obtain sensing data over time and may generate second metadata by using the obtained sensing data. According to an embodiment, the electronic device 1000 may include the sensing data obtained through at least one sensor in the second metadata together with the obtained time information (e.g., time stamp). The sensing data may include, for example, pedestrian dead reckoning (PDR) information. According to an embodiment, the sensing data may be obtained through at least one of an acceleration sensor, a gyro sensor, a geomagnetic sensor, or a barometric pressure sensor.

In operation 1050, the electronic device 1000 may store image data of the image 1070, the first metadata, and the second metadata in a memory such that they are associated with each other. For example, the electronic device 1000 may encode the image data, the first metadata, and the second metadata together and may store the encoded result in the memory. For another example, the electronic device 1000 may attach the first metadata and the second metadata to the image data and may store the attached result in the memory.

The electronic device 1000 may output the image 1070 in a display 1001. The electronic device 1000 is illustrated in FIG. 10 as outputting the image 1070 in a left area of the display 1001, but an output location of the image 1070 is not so limited.

In operation 1081, the electronic device 1000 may obtain location information of each of the external devices by using the first metadata and may display the obtained location information on a map 1090. According to an embodiment, the electronic device 1000 may obtain the location information of each external device based on the identification information of each external device included in the first metadata. The electronic device 1000 may display a display object corresponding to the location information of each external device on the map 1090. The electronic device 1000 may display a first display object 1091 corresponding to location information of the first external device, a second display object 1093 corresponding to location information of the second external device, and a third display object 1095 corresponding to location information of the third external device on the map 1090.

In operation 1083, the electronic device 1000 may determine a movement path of the electronic device 1000 by using the second metadata and may display the determined movement path on the map 1090. According to an embodiment, the electronic device 1000 may determine the movement path of the electronic device 1000 based on sensing data over time included in the second metadata. For another example, the electronic device 1000 may display a display object corresponding to the movement path of the electronic device 1000 on the map 1090, such as a fourth display object 1097.

According to an embodiment, the first display object 1091, the second display object 1093, or the third display object 1095 may be points representing the locations of the external devices on the map 1090, and the fourth display object 1097 may be a line representing a path on the map 1090. However, the shapes of the first display object 1091, the second display object 1093, the third display object 1095, or the fourth display object 1097 are not so limited. Also, the map 1090 is illustrated in FIG. 10 as being output in a right area of the display 1001, but an output location of the map 1090 is not so limited.

Figure 11:
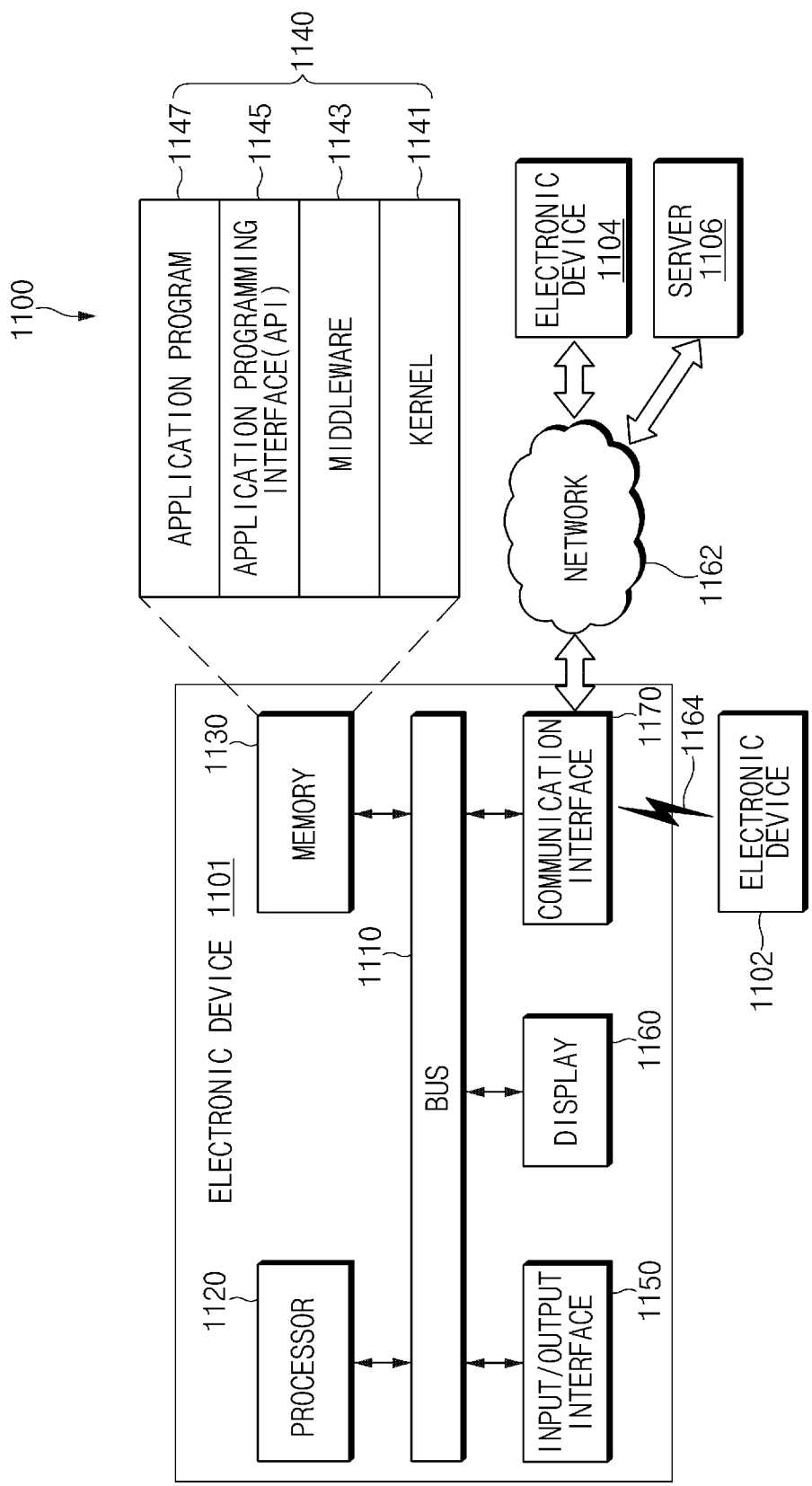
FIG. 11 illustrates an electronic device in a network environment according to an embodiment of the present disclosure.

FIG. 11 illustrates an electronic device in a network environment according to an embodiment of the present disclosure.

An electronic device 1101 in a network environment 1100 according to one embodiment of the present disclosure will be described with reference to FIG. 11. The electronic device 1101 may include a bus 1110, a processor 1120, a memory 1130, an input/output interface 1150, a display 1160, and a communication interface 1170. In various embodiments of the present disclosure, at least one of the foregoing elements may be omitted or another element may be added to the electronic device 1101.

The bus 1110 may include a circuit for connecting the above-mentioned elements 1110 to 1170 to each other and transferring communications (e.g., control messages and/or data) among the above-mentioned elements.

The processor 1120 may be a central processing unit (CPU), an application processor (AP), or a communication processor (CP). The processor 1120 may perform data processing or an operation related to communication and/or control of at least one of the other elements of the electronic device 1101.

The memory 1130 may be a volatile memory and/or a nonvolatile memory. The memory 1130 may store instructions or data related to at least one of the other elements of the electronic device 1101. According to an embodiment of the present disclosure, the memory 1130 may store software and/or a program 1140. The program 1140 may include, for example, kernel 1141, middleware 1143, application programming interface (API) 1145, and/or application program (or an application) 1147. At least a portion of the kernel 1141, the middleware 1143, or the API 1145 may be referred to as an operating system (OS).

The kernel 1141 may control or manage system resources (e.g., the bus 1110, the processor 1120, the memory 1130, or the like) used to perform operations or functions of other programs (e.g., the middleware 1143, the API 1145, or the application program 1147). Furthermore, the kernel 1141 may provide an interface for allowing the middleware 1143, the API 1145, or the application program 1147 to access individual elements of the electronic device 1101 in order to control or manage the system resources.

The middleware 1143 may serve as an intermediary so that the API 1145 or the application program 1147 communicates and exchanges data with the kernel 1141.

Furthermore, the middleware 1143 may handle one or more task requests received from the application program 1147 according to a priority order. For example, the middleware 1143 may assign at least one application program 1147 a priority for using the system resources (e.g., the bus 1110, the processor 1120, the memory 1130, or the like) of the electronic device 1101. For example, the middleware 1143 may handle the one or more task requests according to the priority assigned to the at least one application, thereby performing scheduling or load balancing with respect to the one or more task requests.

The API 1145, which is an interface for allowing the application 1147 to control a function provided by the kernel 1141 or the middleware 1143, may include, for example, at least one interface or function (e.g., instructions) for file control, window control, image processing, character control, or the like.

The input/output interface 1150 may serve to transfer an instruction or data input from a user or another external device to (an)other element(s) of the electronic device 1101. Furthermore, the input/output interface 1150 may output instructions or data received from (an)other element(s) of the electronic device 1101 to the user or another external device.

The display 1160 may be a liquid crystal display (LCD), a light-emitting diode (LED) display, an organic light-emitting diode (OLED) display, a microelectromechanical systems (MEMS) display, an electronic paper display, etc. The display 1160 may present various content (e.g., a text, an image, a video, an icon, a symbol, or the like) to the user. The display 1160 may include a touch screen, and may receive a touch, gesture, proximity or hovering input from an electronic pen or a part of a body of the user.

The communication interface 1170 may set communications between the electronic device 1101 and an external device (e.g., a first external electronic device 1102, a second external electronic device 1104, or a server 1106). For example, the communication interface 1170 may be connected to a network 1162 via wireless communications or wired communications so as to communicate with the external device (e.g., the second external electronic device 1104 or the server 1106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1164. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1101 may transmit the electromagnetic signals to a reader device such as a POS (point of sales) device. The POS device may detect the magnetic signals by using a MST reader and restore data by converting the detected electromagnetic signals into electrical signals.

The GNSS may be a global positioning system (GPS), a global navigation satellite system (GLONASS), a BeiDou navigation satellite system (BeiDou), or Galileo, the European global satellite-based navigation system. The GNSS may be selected based on the available region, the selected bandwidth, or the like. Hereinafter, the term "GPS" and the term "GNSS" may be interchangeably used. The wired communications may employ universal serial bus (USB), high definition multimedia interface (HDMI), recommended standard 232 (RS-232), plain old telephone service (POTS), or the like. The network 1162 may include a telecommunications network such as computer network (e.g., local area network (LAN) or wide area network (WAN)), the Internet, a telephone network, etc.

The types of the first external electronic device 1102 and the second external electronic device 1104 may be the same as or different from the type of the electronic device 1101. According to an embodiment of the present disclosure, the server 1106 may include a group of one or more servers. A portion or all of operations performed in the electronic device 1101 may be performed in one or more other electronic devices (e.g., the first electronic device 1102, the second external electronic device 1104, or the server 1106). When the electronic device 1101 should perform a certain function or service automatically or in response to a request, the electronic device 1101 may request at least a portion of functions related to the function or service from another device (e.g., the first external electronic device 1102, the second external electronic device 1104, or the server 1106) instead of or in addition to performing the function or service itself. The other electronic device (e.g., the first external electronic device 1102, the second external electronic device 1104, or the server 1106) may perform the requested function or additional function, and may transfer the result to the electronic device 1101. The electronic device 1101 may provide the requested function or service using the received result or may additionally process the received result to provide the requested function or service. To this end, for example, a cloud computing technology, a distributed computing technology, or a client-server computing technology may be used.

Figure 12:
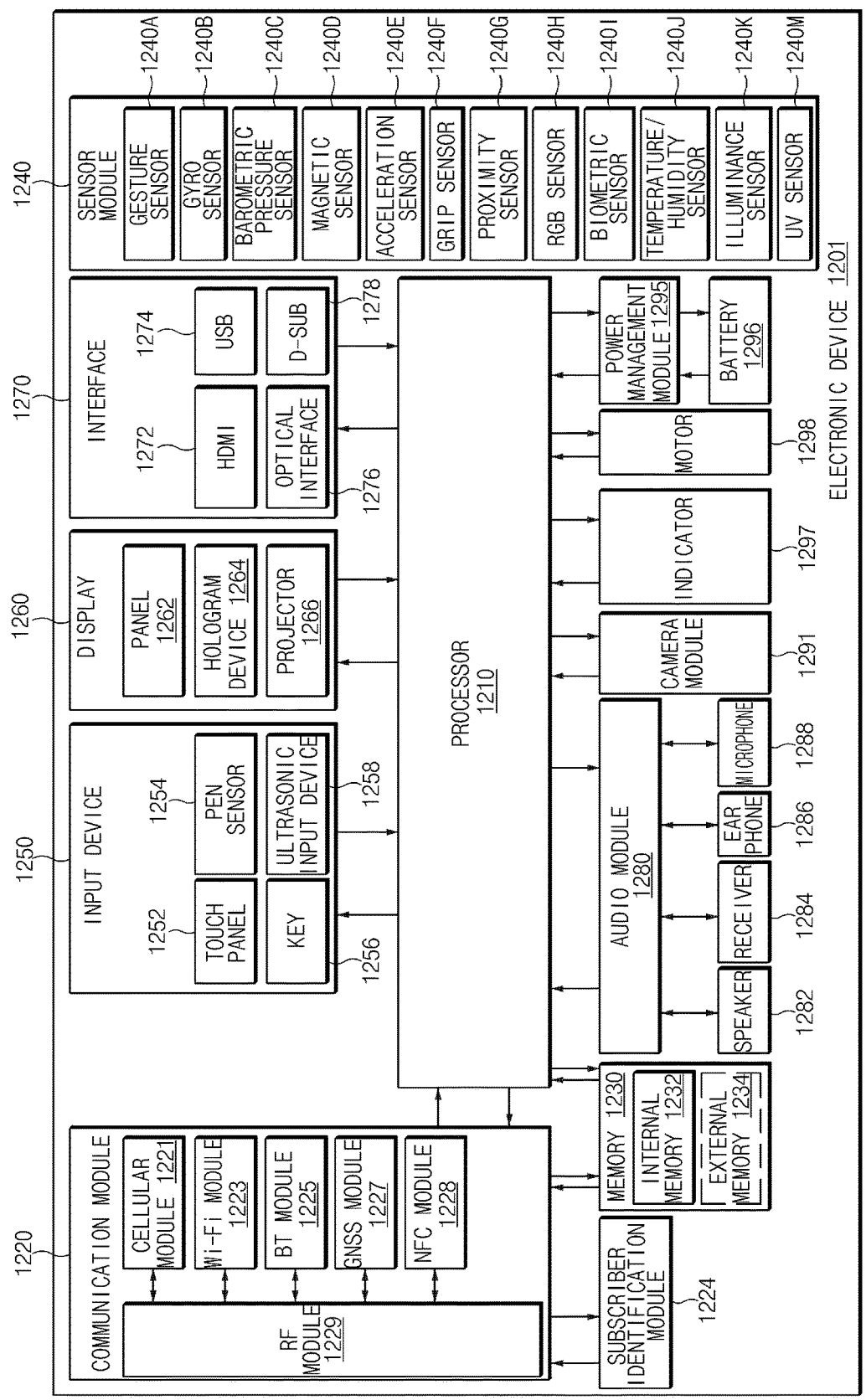
FIG. 12 is a block diagram illustrating an electronic device according to an embodiment of the present disclosure.

FIG. 12 is a block diagram illustrating an electronic device according to an embodiment of the present disclosure.

Referring to FIG. 12, an electronic device 1201 may include, for example, a part or the entirety of the electronic device 1101 illustrated in FIG. 11. The electronic device 1201 may include at least one processor (e.g., AP) 1210, a communication module 1220, a subscriber identification module (SIM) 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may run an operating system or an application program so as to control a plurality of hardware or software elements connected to the processor 1210, and may process various data and perform operations. The processor 1210 may be implemented with, for example, a system on chip (SoC). According to an embodiment of the present disclosure, the processor 1210 may further include a graphic processing unit (GPU) and/or an image signal processor. The processor 1210 may include at least a portion (e.g., a cellular module 1221) of the elements illustrated in FIG. 12. The processor 1210 may load, on a volatile memory, an instruction or data received from at least one of other elements (e.g., a nonvolatile memory) to process the instruction or data, and may store various data in a nonvolatile memory. The processor 1210 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 1220 may have a configuration that is the same as or similar to that of the communication interface 1170 of FIG. 11. The communication module 1220 may include, for example, a cellular module 1221, a Wi-Fi module 1223, a Bluetooth (BT) module 1225, a GNSS module 1227 (e.g., a GPS module, a GLONASS module, a BeiDou module, or a Galileo module), a NFC module 1228, and a radio frequency (RF) module 1229.

The cellular module 1221 may provide, for example, a voice call service, a video call service, a text message service, or an Internet service through a communication network. The cellular module 1221 may identify and authenticate the electronic device 1201 in the communication network using the subscriber identification module 1224 (e.g., a SIM card). The cellular module 1221 may perform at least a part of functions that may be provided by the processor 1210. The cellular module 1221 may include a communication processor (CP).

Each of the Wi-Fi module 1223, the Bluetooth module 1225, the GNSS module 1227 and the NFC module 1228 may include, for example, a processor for processing data transmitted/received through the modules. According to some various embodiments of the present disclosure, at least a part (e.g., two or more) of the cellular module 1221, the Wi-Fi module 1223, the Bluetooth module 1225, the GNSS module 1227, and the NFC module 1228 may be included in a single integrated chip (IC) or IC package.

The RF module 1229 may transmit/receive, for example, communication signals (e.g., RF signals). The RF module 1229 may include, for example, a transceiver, a power amp module (PAM), a frequency filter, a low noise amplifier (LNA), an antenna, or the like. According to another embodiment of the present disclosure, at least one of the cellular module 1221, the Wi-Fi module 1223, the Bluetooth module 1225, the GNSS module 1227, or the NFC module 1228 may transmit/receive RF signals through a separate RF module.

The SIM 1224 may be, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1230 (e.g., the memory 1130) may include, for example, an internal memory 1232 or an external memory 1234. The internal memory 1232 may be a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, a solid state drive (SSD), etc.

The external memory 1234 may be a flash drive such as a compact flash (CF), a secure digital (SD), a Micro-SD, a Mini-SD, an extreme digital (xD), a MultiMediaCard (MMC), a memory stick, or the like. The external memory 1234 may be operatively and/or physically connected to the electronic device 1201 through various interfaces.

The sensor module 1240 may, for example, measure physical quantity or detect an operation state of the electronic device 1201 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., a red/green/blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1240 may further include a control circuit for controlling at least one sensor included therein. In some various embodiments of the present disclosure, the electronic device 1201 may further include a processor configured to control the sensor module 1240 as a part of the processor 1210 or separately, so that the sensor module 1240 is controlled while the processor 1210 is in a sleep state.

The input device 1250 may be, for example, a touch panel 1252, a (digital) pen sensor 1254, a key 1256, or an ultrasonic input device 1258. The touch panel 1252 may employ at least one of capacitive, resistive, infrared, and/or ultraviolet sensing methods. The touch panel 1252 may further include a control circuit. The touch panel 1252 may further include a tactile layer so as to provide haptic feedback to a user.

The (digital) pen sensor 1254 may include, for example, a sheet for recognition which is a part of a touch panel or is separate. The key 1256 may include, for example, a physical button, an optical button, or a keypad. The ultrasonic input device 1258 may sense ultrasonic waves generated by an input tool through a microphone 1288 so as to identify data corresponding to the ultrasonic waves sensed.

The display 1260 (e.g., the display 1160) may be the panel 1262, the hologram device 1264, or the projector 1266. The panel 1262 may have a configuration that is the same as or similar to that of the display 1160 of FIG. 11. The panel 1262 may be, for example, flexible, transparent, or wearable. The panel 1262 and the touch panel 1252 may be integrated into a single module. The hologram device 1264 may display a stereoscopic image into a space using light interference. The projector 1266 may project light onto a screen so as to display an image. The screen may be disposed in the inside or the outside of the electronic device 1201. According to an embodiment of the present disclosure, the display 1260 may further include a control circuit for controlling the panel 1262, the hologram device 1264, or the projector 1266.

The interface 1270 may employ, for example, HDMI 1272, USB 1274, optical interface 1276, or a D-subminiature (D-sub) interface 1278. The interface 1270, for example, may be included in the communication interface 1170 illustrated in FIG. 11. Additionally or alternatively, the interface 1270 may include, for example, a mobile high-definition link (MHL) interface, an SD card/multi-media card (MMC) interface, or an infrared data association (IrDA) interface.

The audio module 1280 may convert, for example, sounds into an electrical signal or vice versa. At least a portion of elements of the audio module 1280 may be included in the input/output interface 1150 illustrated in FIG. 11. The audio module 1280 may process sound information input or output through a speaker 1282, a receiver 1284, an earphone 1286, or the microphone 1288.

The camera module 1291 is, for example, a device for shooting a still image or a video. According to an embodiment of the present disclosure, the camera module 1291 may include image sensors (e.g., a front sensor or a rear sensor), lenses, one or more image signal processors (ISP), and/or a flash (e.g., an LED or a xenon lamp).

The power management module 1295 may manage power of the electronic device 1201. According to an embodiment of the present disclosure, the power management module 1295 may include a power management integrated circuit (PMIC), a charger integrated circuit (IC), or a battery or gauge. The PMIC may employ wired and/or wireless charging methods. The wireless charging method may employ, for example, magnetic resonance charging, magnetic induction charging, electromagnetic charging, or the like. An additional circuit for wireless charging, such as a coil loop, a resonant circuit, a rectifier, or the like, may be further included. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as states when the electronic device 201 is booting, transceiving a message, charging, or the like. The motor 1298 may convert an electrical signal into a mechanical vibration, and may generate a vibration or haptic effect. Although not illustrated, a processing device (e.g., a GPU) for supporting a mobile TV may be included in the electronic device 1201. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 13:
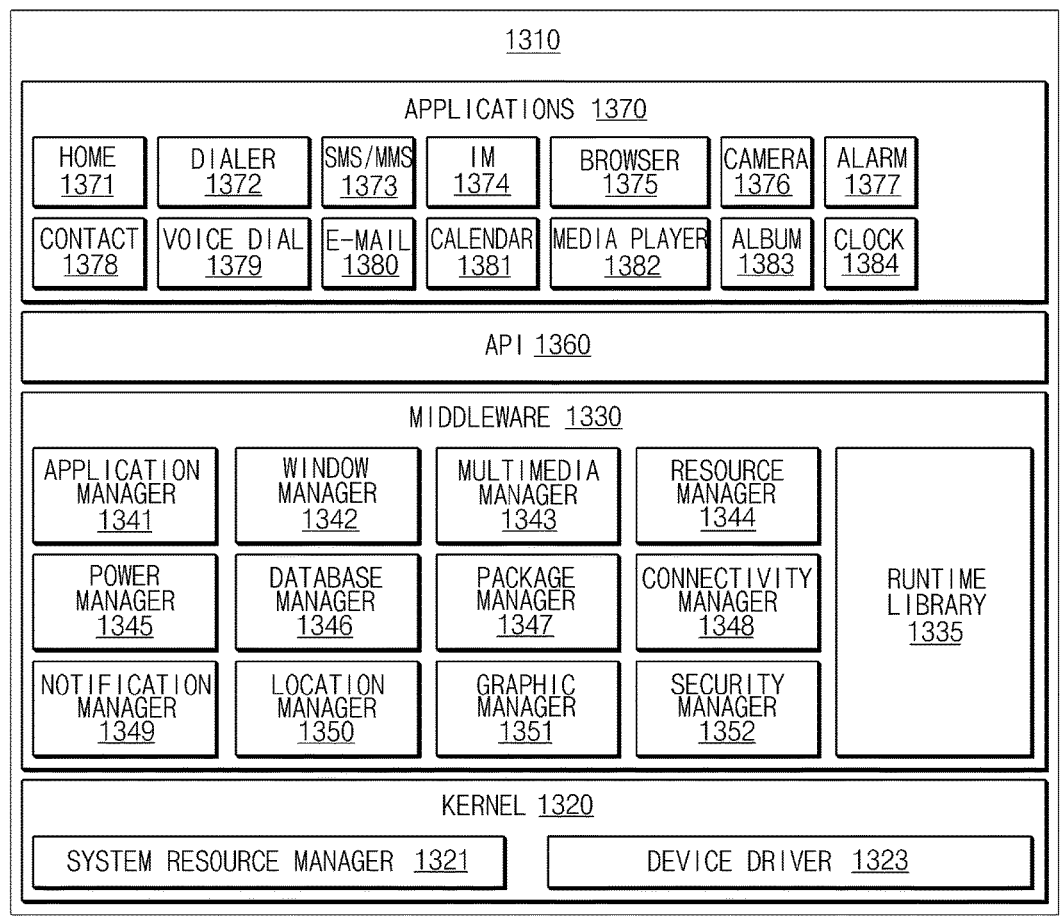
FIG. 13 is a block diagram illustrating a program module according to an embodiment of the present disclosure.

FIG. 13 is a block diagram illustrating a program module according to an embodiment of the present disclosure.

Referring to FIG. 13, a program module 1310 (e.g., the program 1140) may include an operating system (OS) for controlling a resource related to the corresponding electronic device (e.g., the electronic device 1101) and/or various applications (e.g., the application program 1147) running on the OS. The operating system may be, for example, Android, iOS, Windows, Symbian, Tizen, or the like.

The program module 1310 may include a kernel 1320, a middleware 1330, an API 1360, and/or an application 1370. At least a part of the program module 1310 may be preloaded on an electronic device or may be downloaded from an external electronic device (e.g., the first electronic device 1102, the second external electronic device 1104, or the server 1106).

The kernel 1320 (e.g., the kernel 1141) may include, for example, a system resource manager 1321 or a device driver 1323. The system resource manager 1321 may perform control, allocation, or retrieval of a system resource. According to an embodiment of the present disclosure, the system resource manager 1321 may include a process management unit, a memory management unit, a file system management unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330, for example, may provide a function that the applications 1370 require in common, or may provide various functions to the applications 1370 through the API 1360 so that the applications 1370 may efficiently use limited system resources in the electronic device. According to an embodiment of the present disclosure, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, and a security manager 1352.

The runtime library 1335 may include, for example, a library module that a complier uses to generate new functions while the application 1370 is running. The runtime library 1335 may perform a function for input/output management, memory management, or an arithmetic function.

The application manager 1341 may mange, for example, a life cycle of at least one of the applications 1370. The window manager 1342 may manage a GUI resource used in a screen. The multimedia manager 1343 may recognize a format required for playing various media files and may encode or decode a media file using a codec matched to the format. The resource manager 1344 may manage a resource such as a source code, a memory, or a storage space of at least one of the applications 1370.

The power manager 1345, for example, may operate together with a basic input/output system (BIOS) to manage power (e.g. battery power), and may provide power information required for operating the electronic device. The database manager 1346 may generate, search, or modify a database to be used in at least one of the applications 1370. The package manager 1347 may manage installation or update of an application distributed in a package file format.

The connectivity manager 1348 may manage wireless connection of Wi-Fi, Bluetooth, or the like. The notification manager 1349 may display or notify an event such as message arrival, appointments, and proximity alerts in such a manner as not to disturb a user. The location manager 1350 may manage location information of the electronic device. The graphic manager 1351 may manage a graphic effect to be provided to a user or a user interface related thereto. The security manager 1352 may provide various security functions required for system security or user authentication. According to an embodiment of the present disclosure, in the case in which an electronic device (e.g., the electronic device 1101) includes a phone function, the middleware 1330 may further include a telephony manager for managing a voice or video call function of the electronic device.

The middleware 1330 may include a middleware module for forming a combination of various functions of the above-mentioned elements. The middleware 1330 may provide a module specialized for each type of an operating system to provide differentiated functions. Furthermore, the middleware 1330 may delete a part of existing elements or may add new elements dynamically.

The API 1360 (e.g., the API 1145) which is, for example, a set of API programming functions may be provided in different configurations according to an operating system. For example, in the case of Android or iOS, one API set may be provided for each platform, and, in the case of Tizen, at least two API sets may be provided for each platform.

The application 1370 (e.g., the application program 1147), for example, may include at least one application capable of performing functions such as a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384, health care (e.g., measure an exercise amount or blood sugar), or environmental information provision (e.g., provide air pressure, humidity, or temperature information).

According to an embodiment of the present disclosure, the application 1370 may include an information exchange application for supporting information exchange between the electronic device (e.g., the electronic device 1101) and an external electronic device (e.g., the first electronic device 1102 or the second external electronic device 1104). The information exchange application may include, for example, a notification relay application for relaying specific information to the external electronic device or a device management application for managing the external electronic device.

For example, the notification relay application may have a function for relaying, to an external electronic device (e.g., the first electronic device 1102 or the second external electronic device 1104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1102 or the second external electronic device 1104) communicating with the electronic device, an application running in the external electronic device, or a service (e.g., a call service, a message service, or the like) provided from the external electronic device.

According to an embodiment of the present disclosure, the application 1370 may include a specified application (e.g., a healthcare application of a mobile medical device) according to an attribute of the external electronic device (e.g., the first electronic device 1102 or the second external electronic device 1104). The application 1370 may include an application received from an external electronic device (e.g., the first electronic device 1102 or the second external electronic device 1104). The application 1370 may include a preloaded application or a third-party application downloadable from a server. The names of the elements of the program module 1310 illustrated may vary with the type of an operating system.

According to various embodiments of the present disclosure, at least a part of the program module 1310 may be implemented with software, firmware, hardware, or a combination thereof. At least a part of the program module 1310, for example, may be implemented (e.g., executed) by a processor (e.g., the processor 1210). At least a part of the program module 1310 may include, for example, a module, a program, a routine, sets of instructions, or a process for performing at least one function.

Figure 14:
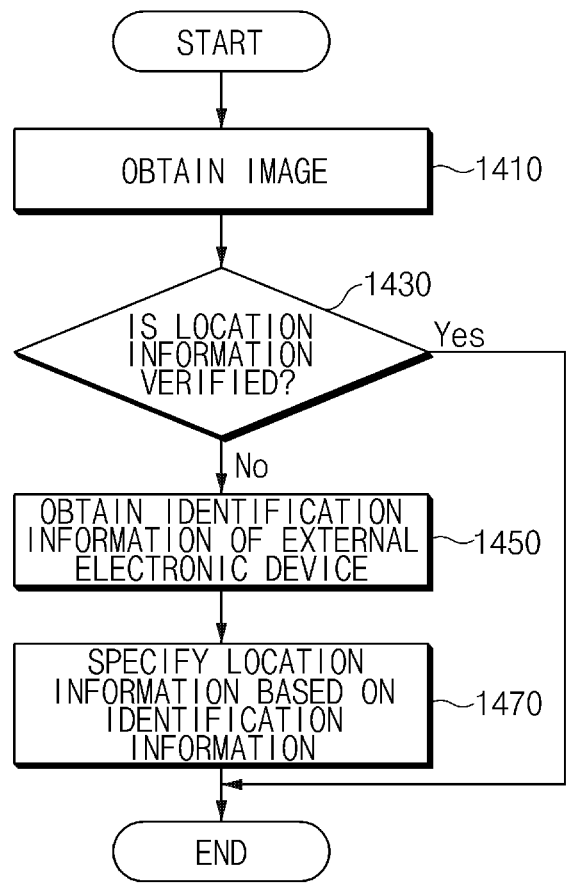
FIG. 14 is a flowchart illustrating an operating method of an electronic device capable of processing an image, according to an embodiment.

FIG. 14 is a flowchart illustrating an operating method of an electronic device capable of processing an image, according to an embodiment.

Referring to FIG. 14, in operation 1410, an electronic device (e.g., the electronic device 100 of FIG. 1) may obtain an image or a video. According to an embodiment, the electronic device may obtain an image or a video using a camera (e.g., the camera 150 of FIG. 1).

In operation 1430, the electronic device may verify the location information of the photographing point of the image or the video. According to an embodiment, the electronic device may determine whether the location information is included in metadata of the image or the video. In any embodiment, the location information may be embodied as a tag (e.g., a geo tag) in the metadata. In this case, the electronic device may determine whether the specified tag is present in the metadata and may verify the location information of the photographing point based on the determination.

In the case where the location information of the photographing point of the image or the video is not verified (e.g., the location information is not present in the metadata), in operation 1450, the electronic device may obtain identification information of an external electronic device. The external electronic device may be a device in communication with the electronic device via various protocols such as Wi-Fi, BT, BLE, NFC, beacon, or Li-Fi. The identification information of the external electronic device may include, for example, Wi-Fi scan information, BT/BLE scan information, audio beacon information, or Li-Fi scan information.

In operation 1470, the electronic device may specify (or determine) the location information associated with the photographing point of the image or the video based on the identification information of the external electronic device. According to an embodiment, the electronic device may obtain the location information of the external electronic using the identification information of the external electronic device. For example, the electronic device may find location information corresponding to the identification information in a look-up table. The location information associated with of the photographing point of the image or the video may be determined by using the location information of the external device and a location relationship between the external electronic device and the electronic device.

Figure 15:
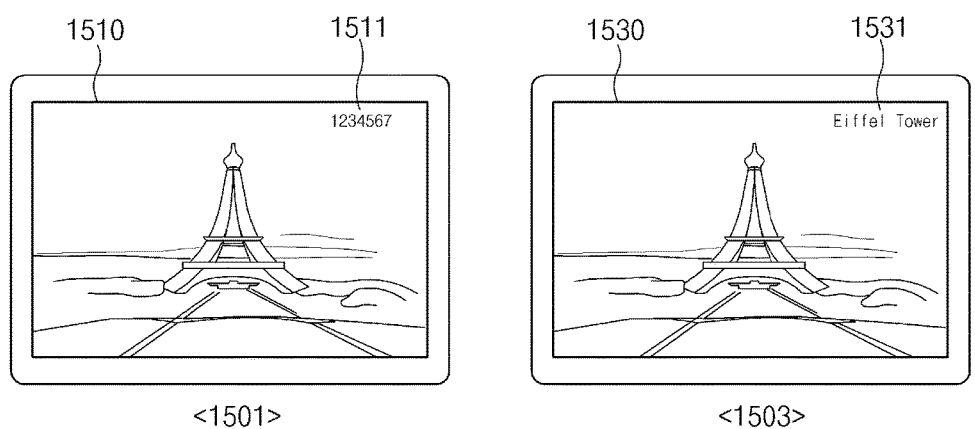
FIG. 15 is a view illustrating an example of a screen of an electronic device capable of processing an image, according to an embodiment.

FIG. 15 is a view illustrating an example of a screen of an electronic device capable of processing an image, according to an embodiment.

Referring to FIG. 15, when an electronic device fails to obtain location information of the photographing point of the image 1510, as shown in 1501, the electronic device may display a display object 1511 corresponding to identification information of an external electronic device together with the image 1510. Alternatively, when the electronic device fails to obtain the location information of the photographing point of the image 1510, the electronic device may display only the image 1510 in the display.

According to an embodiment, when the electronic device obtains location information of the photographing point of the image 1530, as shown in 1503, the electronic device may display a display object 1531 corresponding to the location information of the photographing point of the image 1530 together with the image 1530.

As described above, according to one embodiment, an image processing method of an electronic device may include obtaining an image using a camera, verifying location information associated with a photographing point of the image, obtaining identification information of an external electronic device from the external electronic device through a communication circuit if the location information of the image is not verified, and determining the location information of the image based on the identification information of the external electronic device.

According to one embodiment, the determining of the location information of the image may include transmitting the identification information of the external electronic device to another external electronic device through the communication circuit, and receiving, from the another external electronic device, location information of the external electronic device determined based on the identification information of the external electronic device.

According to one embodiment, the transmitting of the identification information of the external electronic device to the other external electronic device may include including the identification information of the external electronic device in attribute information of the image, and transmitting the attribute information of the image to the other external electronic device.

According to one embodiment, the image processing method may further include displaying the image and the location information of the image in a display.

According to one embodiment, the image processing method may further include obtaining movement data of the electronic device using a sensor, obtaining time information associated with when the image is obtained, and determining a movement path of the electronic device based at least on the time information and the movement data.

According to one embodiment, the image processing method may further include encoding data corresponding to the image, and including the identification information of the external electronic device in the encoded data.

According to one embodiment, the image processing method may further include including the location information of the image in the metadata corresponding to the image.

The term "module" used herein may represent, for example, a unit including one of hardware, software and firmware or a combination thereof. The term "module" may be interchangeably used with the terms "unit," "logic," "logical block," "component," and "circuit." The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1120), the processor may perform functions corresponding to the instructions. The computer-readable storage medium may be, for example, the memory 1130.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

At least some aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a camera;
a communication circuit configured to communicate with an external electronic device; and
a processor configured to:
obtain an image using the camera;
verify location information, obtained when capturing the image and associated with a photographing point of the image;
obtain identification information of the external electronic device from the external electronic device if the location information of the image is not verified;
obtain at least one of spacing distance information and direction information between the electronic device and the external electronic device;
determine a location relationship between the electronic device and the external electronic device based on at least one of the spacing distance information and the direction information;
determine a location of the external electronic device based on the identification information of the external electronic device; and
determine the location information of the image based on the location of the external electronic device and the location relationship between the electronic device and the external electronic device, wherein the location information includes information on a photographing point of the image.

2. The electronic device of claim 1, further comprising:
a memory configured to store the identification information of the external electronic device.

3. The electronic device of claim 1, wherein, to determine the location of the external electronic device, the processor is further configured to:

transmit the identification information of the external electronic device to another external electronic device through the communication circuit; and receive, from the another external electronic device, location information of the external electronic device determined based on the identification information of the external electronic device.

4. The electronic device of claim 3, wherein, to transmit the identification information of the external electronic device to the other external electronic device, the processor is further configured to:

include the identification information of the external electronic device in attribute information of the image; and transmit the attribute information of the image to the other external electronic device.

5. The electronic device of claim 1, further comprising:
a display,
wherein the processor is further configured to:
display the image and the location information of the image in the display.

6. The electronic device of claim 1, further comprising:
a sensor for sensing a movement of the electronic device,
wherein the processor is further configured to:
obtain time information associated with when the image is obtained; and
determine a movement path of the electronic device based at least on the time information and data generated by the sensor.

7. The electronic device of claim 1, wherein the processor is further configured to:
encode data corresponding to the image; and
include the identification information of the external electronic device in the encoded data.

8. The electronic device of claim 1, wherein the processor is further configured to:
include the location information of the image in metadata corresponding to the image.

9. The electronic device of claim 1, wherein the external electronic device is capable of communication using at least one of wireless-fidelity (Wi-Fi), Bluetooth (BT), Bluetooth low energy (BLE), near field communication (NFC), beacon, and light-fidelity (Li-Fi).

10. The electronic device of claim 1, wherein the identification information of the external electronic device includes at least one of Wi-Fi scan information, BT/BLE scan information, audio beacon information, and Li-Fi scan information.

11. An image processing method of an electronic device, the method comprising:
obtaining an image using a camera;
verifying location information, obtained when capturing the image and associated with a photographing point of the image;
obtaining identification information of an external electronic device from the external electronic device through a communication circuit if the location information of the image is not verified;
obtaining at least one of spacing distance information and direction information between the electronic device and the external electronic device;
determining a location relationship between the electronic device and the external electronic device based on at least one of the spacing distance information and the direction information;
determining a location of the external electronic device based on the identification information of the external electronic device; and
determining the location information of the image based on the location of the external electronic device and the location relationship between the electronic device and the external electronic device, wherein the location information includes information on a photographing point of the image.

12. The method of claim 11, wherein the determining of the location of the external electronic device further comprises:
transmitting the identification information of the external electronic device to another external electronic device through the communication circuit; and
receiving, from the another external electronic device, location information of the external electronic device determined based on the identification information of the external electronic device.

13. The method of claim 12, wherein the transmitting of the identification information of the external electronic device to the other external electronic device further comprises:
including the identification information of the external electronic device in attribute information of the image; and
transmitting the attribute information of the image to the other external electronic device.

14. The method of claim 11, further comprising:
displaying the image and the location information of the image in a display.

15. The method of claim 11, further comprising:
obtaining movement data of the electronic device using a sensor;
obtaining time information associated with when the image is obtained; and
determining a movement path of the electronic device based at least on the time information and the movement data.

16. The method of claim 11, further comprising:
encoding data corresponding to the image; and
including the identification information of the external electronic device in the encoded data.

17. The method of claim 11, further comprising:
including the location information of the image in metadata corresponding to the image.

* * * * *